United States Patent
Mahara

(10) Patent No.: US 12,366,641 B2
(45) Date of Patent: Jul. 22, 2025

(54) RANGING APPARATUS AND MEASURING APPARATUS

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1067 days.

(21) Appl. No.: 17/309,601

(22) PCT Filed: Nov. 13, 2019

(86) PCT No.: PCT/JP2019/044451
§ 371 (c)(1),
(2) Date: Jun. 9, 2021

(87) PCT Pub. No.: WO2020/129474
PCT Pub. Date: Jun. 25, 2020

(65) Prior Publication Data
US 2022/0018944 A1    Jan. 20, 2022

(30) Foreign Application Priority Data
Dec. 18, 2018 (JP) .................. 2018-236325

(51) Int. Cl.
*G01S 7/487* (2006.01)
*G01S 7/4865* (2020.01)

(52) U.S. Cl.
CPC ......... *G01S 7/4876* (2013.01); *G01S 7/4865* (2013.01)

(58) Field of Classification Search
CPC .................................................. G01S 7/4865
See application file for complete search history.

(56) References Cited

U.S. PATENT DOCUMENTS

2015/0285625 A1  10/2015  Deane
2016/0245908 A1   8/2016  Shimizu
(Continued)

FOREIGN PATENT DOCUMENTS

CN   106165399 A   11/2016
CN   110235024 A    9/2019
(Continued)

OTHER PUBLICATIONS

International Search Report and Written Opinion of PCT Application No. PCT/JP2019/044451, issued on Feb. 4, 2020, 12 pages of ISRWO.

*Primary Examiner* — Luke D Ratcliffe
*Assistant Examiner* — Clara G Chilton
(74) *Attorney, Agent, or Firm* — CHIP LAW GROUP

(57) ABSTRACT

A ranging apparatus includes a photodetector including a light detecting device, a time measuring section for measuring a period of time from an emission timing at which a light source emits light to a detection timing at which the light detecting device detects the light, thereby acquiring measured values, a generating section for generating a histogram of the measured values, and a calculating section for calculating the distance up to a measurand on the basis of the histogram. The generating section generates the histogram on the basis of plural measuring conditions.

14 Claims, 14 Drawing Sheets

(56) References Cited

U.S. PATENT DOCUMENTS

2018/0209846 A1\* 7/2018 Mandai .................. G01S 17/08
2018/0231660 A1 8/2018 Deane
2019/0277970 A1 9/2019 Deane

FOREIGN PATENT DOCUMENTS

| DE | 102016120665 B3 \* | 4/2018 |
| EP | 3059609 A1 | 8/2016 |
| JP | 2000-206246 A | 7/2000 |
| JP | 2003-149323 A | 5/2003 |
| JP | 2006-322834 A | 11/2006 |
| JP | 2008-076390 A | 4/2008 |
| JP | 2016-151458 A | 8/2016 |
| JP | 2016-156620 A | 9/2016 |
| JP | 2017-520134 A | 7/2017 |
| KR | 10-2016-0142839 A | 12/2016 |
| WO | 2015/157341 A1 | 10/2015 |
| WO | 2018/140522 A2 | 8/2018 |

\* cited by examiner

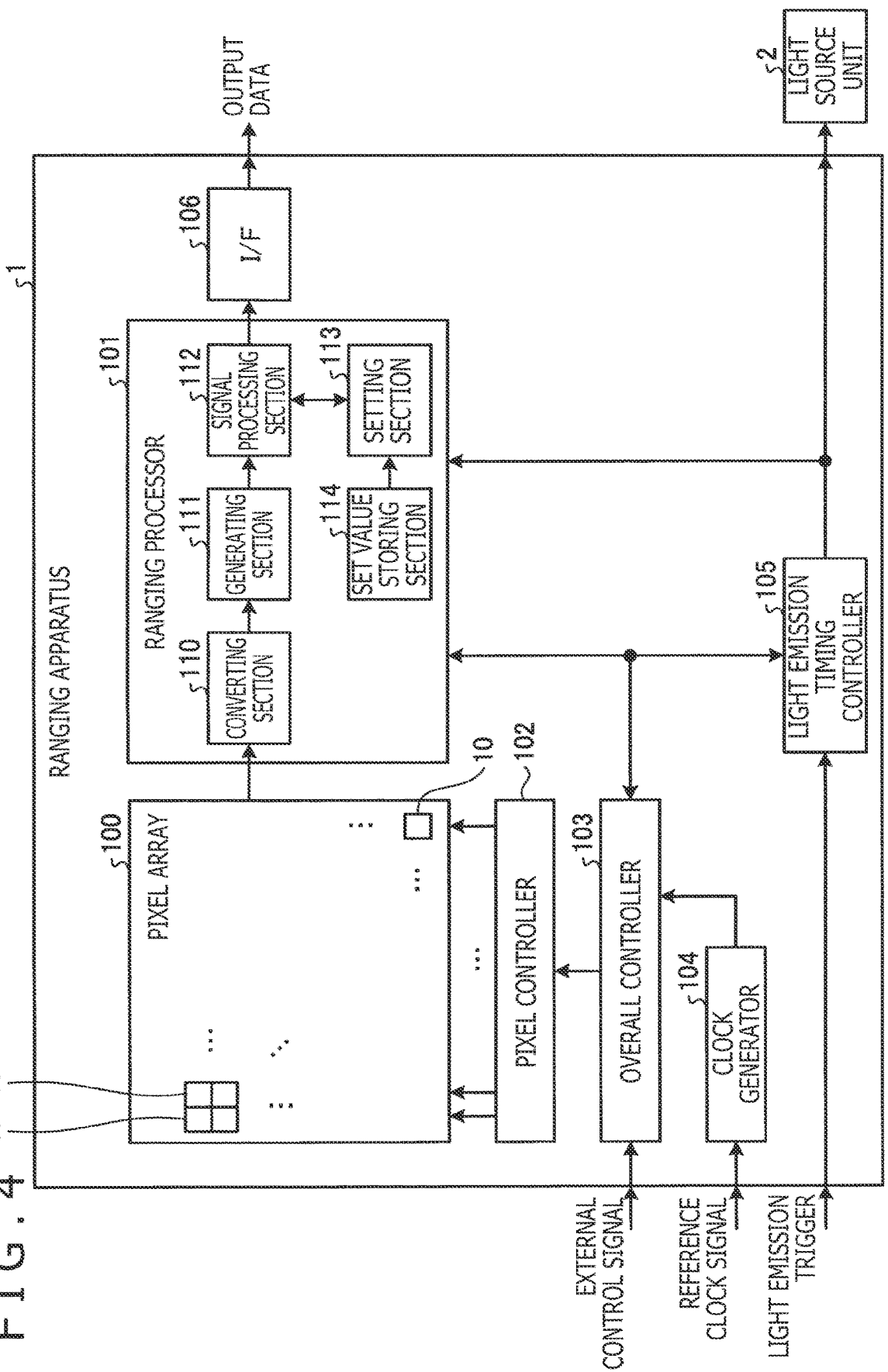
F I G. 4

RANGING APPARATUS AND MEASURING APPARATUS

CROSS REFERENCE TO RELATED APPLICATIONS

This application is a U.S. National Phase of International Patent Application No. PCT/JP2019/044451 filed on Nov. 13, 2019, which claims priority benefit of Japanese Patent Application No. JP 2018-236325 filed in the Japan Patent Office on Dec. 18, 2018. Each of the above-referenced applications is hereby incorporated herein by reference in its entirety.

TECHNICAL FIELD

The present invention relates to a ranging apparatus and a measuring apparatus.

BACKGROUND ART

A ranging method called a direct ToF (Time of Flight) method is known as one of ranging methods for measuring the distance up to a measurand with use of light. According to the direct ToF method, light emitted from a light source is reflected by a measurand and the reflected light is detected by a light detecting device, to measure the distance up to the object on the basis of a time spent after the light was emitted until it is detected as the reflected light.

CITATION LIST

Patent Literature

[PTL 1]
Japanese Patent Laid-open NO. 2008-076390

SUMMARY

Technical Problems

In ranging processes, there are instances where it is desirable to apply different processes depending on the distances up to measurands. For example, a ranging process of higher accuracy may be performed with a higher ranging frequency on a measurand in a shorter range, whereas a noise component may be removed for a measurand in a longer range. If simultaneity is required for such ranging processes depending on distances, then it is necessary to process a huge amount of data and to carry out complex algorithms.

On the other hand, simultaneity may not be required and ranging processes may be performed on respective distances by setting ranging conditions according to the distances to the measurands. According to such an approach, however, in a case where the measurand is a moving body or a ranging apparatus for performing ranging processes is incorporated in a mobile body, the distance up to the measurand varies during the ranging process to the extent that it may not match preset ranging conditions, making it difficult to perform ranging processes on the measurand.

It is an object of the present disclosure to provide a ranging apparatus and a measuring apparatus which are capable of performing ranging processes depending on respective distances with a simpler arrangement.

Solution to Problems

A ranging apparatus according to the present disclosure includes a photodetector including a light detecting device, a time measuring section for measuring a period of time from an emission timing at which a light source emits light to a detection timing at which the light detecting device detects the light, thereby acquiring measured values, a generating section for generating a histogram of the measured values, and a calculating section for calculating the distance up to a measurand on the basis of the histogram, wherein the generating section generates the histogram on the basis of plural measuring conditions regarding the period of time.

BRIEF DESCRIPTION OF DRAWINGS

FIG. 4 is a block diagram illustrating details of the configuration of an example of the ranging apparatus applicable to the embodiments.

DESCRIPTION OF EMBODIMENTS

Hereinafter, embodiments of the present disclosure will be descried in detail with reference to the drawings. Note that, in the embodiments to be described below, identical parts will be denoted by identical reference signs, and redundant explanation will be omitted from description.

Technology Applicable to the Embodiments

The present disclosure relates to a technology for measuring distances with use of light and is capable of performing ranging processes for measuring respective distances with a simpler arrangement. Prior to describing the description of the embodiments, the technology applicable to each of the embodiments will be described below for easier understanding thereof. In each of the embodiments, a direct ToF (Time Of Flight) method is applied as a ranging method. According to the direct ToF method, light emitted from a light source is reflected by a measurand and the reflected light is detected by a light detecting device, to measure the distance up to the measurand on the basis of the time of the difference between the timing of the emission of the light and the timing of the detection of the reflected light.

Figure 1:
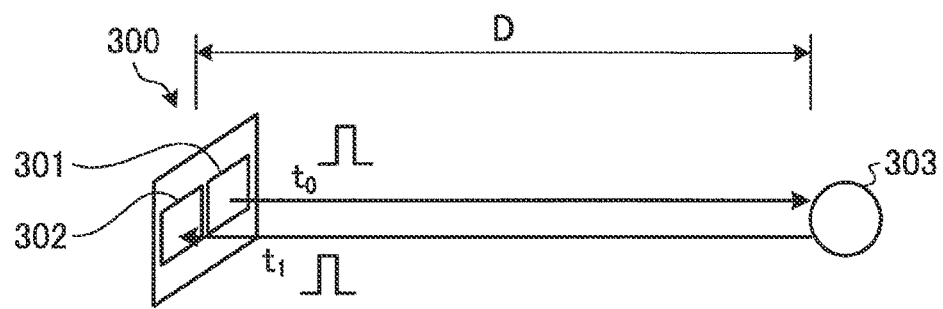
FIG. 1 is a diagram schematically illustrating a ranging process according to a direct ToF method that is applicable to various embodiments.

The direct ToF method will generally be described below with reference to FIGS. 1 and 2. FIG. 1 is a diagram schematically illustrating a ranging process according to a direct ToF method that is applicable to various embodiments. A ranging apparatus 300 includes a light source unit 301 and a photodetector 302. The light source unit 301 includes a laser diode, for example, that is energized to emit a pulsed laser beam. The light emitted from the light source unit 301 is reflected by a measurand 303 and detected as reflected light by the photodetector 302. The photodetector 302 includes a light detecting device for converting light into an electric signal by way of photoelectric conversion, and outputs a signal depending on the detected light.

It is assumed that a point of time (emission timing) at which the light source unit 301 emits light is represented by time to and a point of time (detection timing) at which the photodetector 302 detects the reflected light from the measurand 303 that has reflected the light emitted from the light source unit 301 is represented by time $t_1$. Given that the speed of light ($2.9979 \times 10^8$ [m/sec.]) is represented by a constant c, the distance D between the ranging apparatus 300 and the measurand 303 is calculated according to the following equation (1):

$$D=(c/2) \times (t_1-t_0) \qquad (1)$$

The ranging apparatus 300 repeats the above process plural times. The photodetector 302 may include plural light detecting devices, and the ranging apparatus 300 may calculate the distance D on the basis of a detection timing at which the reflected light is detected by each of the light detecting devices. The ranging apparatus 300 classifies periods $t_m$ of time (referred to as "detection times $t_m$") from time to, i.e., emission timing, until the detection timing at which the light is detected by the photodetector 302, into ranges (bins), and generates a histogram.

Note that the light that the photodetector 302 has detected during the detection times $t_m$ is not limited to the reflected light represented by the light emitted from the light source unit 301 and reflected by the measurand. For example, ambient light around the ranging apparatus 300 (the photodetector 302) is also detected by the photodetector 302.

Figure 2:
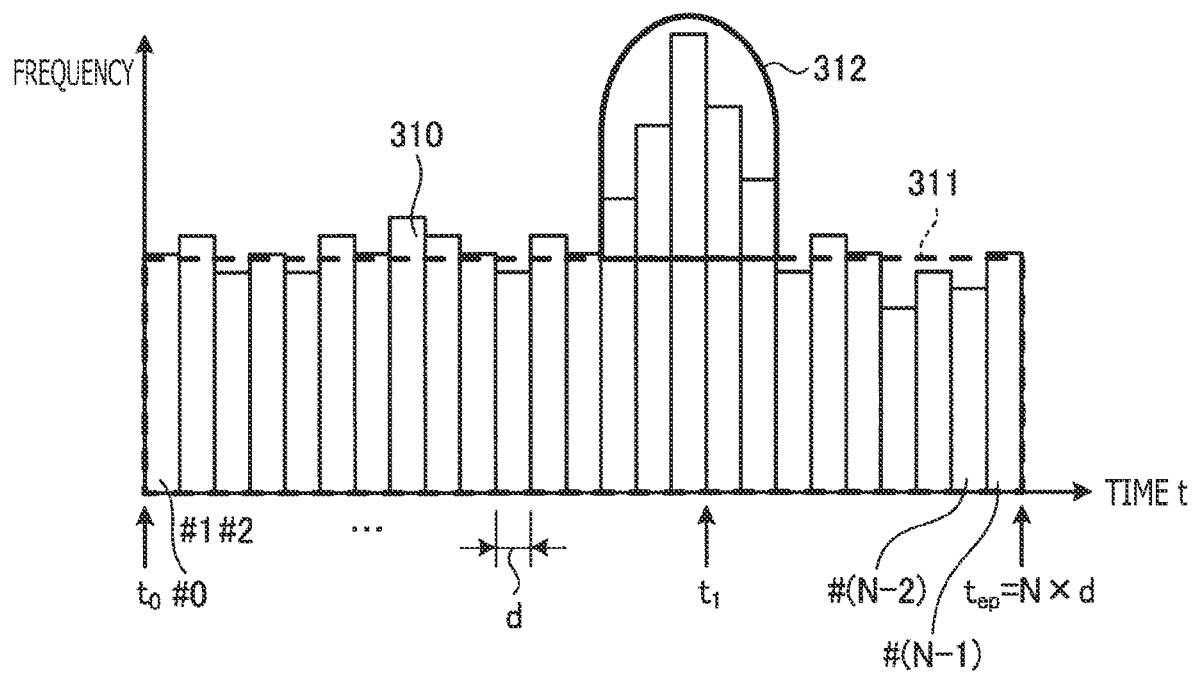
FIG. 2 is a diagram illustrating an example of a histogram based on points of times at which light is detected by a photodetector, the histogram being applicable to a first embodiment.

FIG. 2 is a diagram illustrating an example of histogram based on points of time at which light is detected by the photodetector 302, the histogram being applicable to a first embodiment. In FIG. 2, the horizontal axis represents bins and the vertical axis represents a frequency for each of the bins. The bins represent respective predetermined unit times d into which each of the detection times $t_m$ is divided. Specifically, the bin #0 represents $0 \leq t_m < d$, the bin #1 represents $d \leq t_m \leq 2 \times d$, the bin #2 represents $2 \times d \leq t_m \leq 3 \times d$, ..., the bin #(N-2) represents $(N-2) \times d \leq t_m \leq (N-1) \times d$. In a case where the exposure period of time of the photodetector 302 is represented by $t_{ep}$, $t_{ep} = N \times d$ holds.

The ranging apparatus 300 counts the number of times that detection times $t_m$ are acquired, on the basis of the bins, and determines a frequency 310 for each of the bins, thereby generating a histogram. At this time, the photodetector 302 also detects light other than the reflected light represented by the light emitted from the light source unit 301 and reflected by the measurand. One example of such light other than the reflected light as a target to be measured is the ambient light referred to above. The ambient light represents light randomly applied to the photodetector 302, and an ambient light component 311 due to the ambient light in the histogram acts as a noise against the reflected light as the target.

On the other hand, the reflected light as the target represents light detected depending on a particular distance, and appears as an active light component 312 in the histogram. The bin corresponding to the peak frequency in the active light component 312 corresponds to the distance D up to the measurand 303. The ranging apparatus 300 can calculate the distance D up to the measurand 303, based on the above-mentioned equation (1), by acquiring the representative point of time of the bin (e.g., the central point of time of the bin) as the time $t_1$. As described above, using the plural occurrences of detected light, it is possible to perform an appropriate ranging process over random noise.

Figure 3:
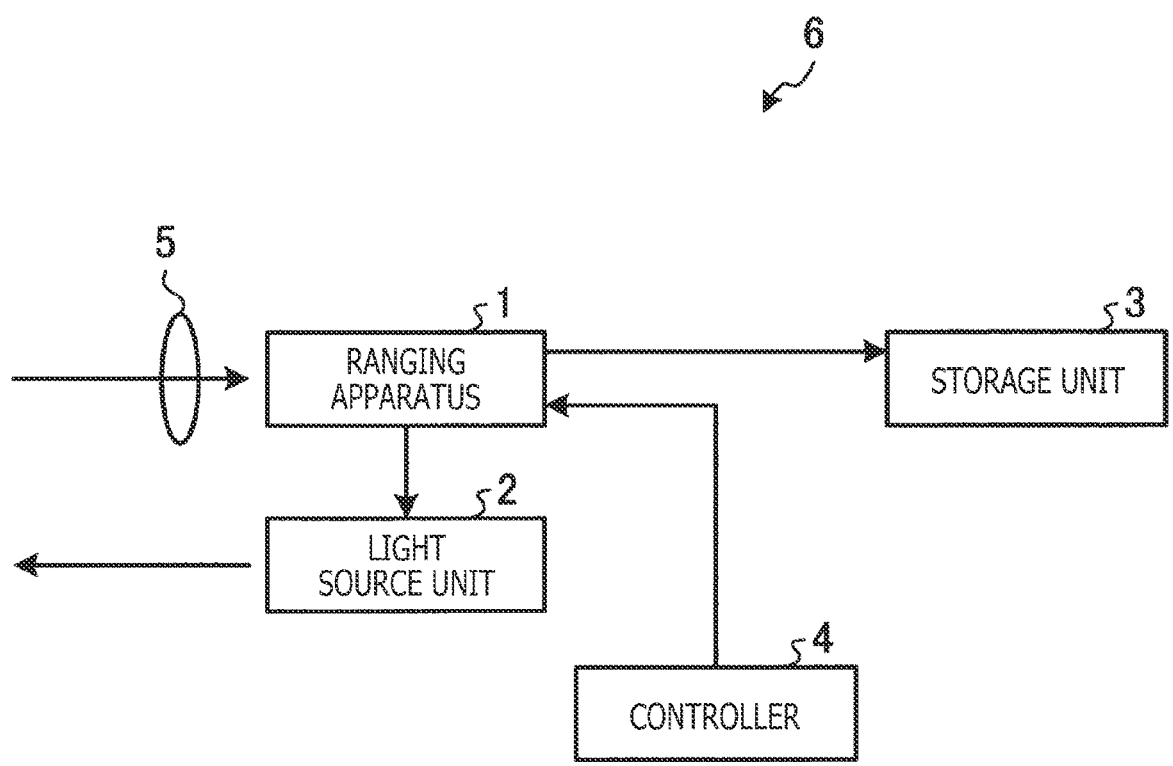
FIG. 3 is a block diagram illustrating the configuration of an example of an electronic appliance incorporating a ranging apparatus according to the embodiments.

FIG. 3 is a block diagram illustrating the configuration of an example of an electronic appliance incorporating a ranging apparatus according to the embodiments. In FIG. 3, the electronic appliance, denoted by 6, includes a ranging apparatus 1, a light source unit 2, a storage unit 3, a controller 4, and an optical system 5.

The light source unit 2 corresponds to the light source unit 301 described above, and includes a laser diode that is energized to emit a pulsed laser beam, for example. The light source unit 2 may incorporate a VCSEL (Vertical Cavity Surface Emitting LASER) for emitting a laser beam, as its surface light source. However, the light source unit 2 is not limited to such a light source, and may incorporate an array of laser diodes arranged in line where a laser beam emitted from the laser diode array is scanned in a direction perpendicular to the line. Furthermore, the laser source unit 2 may incorporate a laser diode as a single light source where a laser beam emitted from the laser diode is scanned in horizontal and vertical directions.

The ranging apparatus 1 corresponds to the photodetector 302, and includes plural light detecting devices. The plural light detecting devices are arrayed in a two-dimensional grid that provides a light detecting surface, for example. The optical system 5 guides light applied from outside to the light detecting surface included in the ranging apparatus 1.

The controller 4 controls overall operation of the electronic appliance 6. For example, the controller 4 supplies the ranging apparatus 1 with a light emission trigger as a trigger for enabling the light source unit 2 to emit light. The ranging apparatus 1 causes the light source unit 2 to emit light at a timing based on the light emission trigger, and stores time to representing an emission timing. Furthermore, the controller 4 sets a pattern for ranging with respect to the ranging apparatus 1 in response to an instruction from outside, for example.

The ranging apparatus 1 counts the number of times that time information (detection time $t_m$) representing a timing at which light is detected by the light detecting surface is acquired, and determines a frequency for each bin, thereby generating the histogram described above. Furthermore, the ranging apparatus 1 calculates the distance D up to the measurand on the basis of the generated histogram. Information representing the calculated distance D is stored in the storage unit 3.

FIG. 4 is a block diagram illustrating details of the configuration of an example of the ranging apparatus 1 applicable to the embodiments. In FIG. 4, the ranging apparatus 1 includes a pixel array 100, a ranging processor 101, a pixel controller 102, an overall controller 103, a clock generator 104, a light emission timing controller 105, and an interface (I/F) 106. The pixel array 100, the ranging processor 101, the pixel controller 102, the overall controller 103, the clock generator 104, the light emission timing controller 105, and the interface (I/F) 106 are disposed on one semiconductor chip, for example.

In FIG. 4, the overall controller 103 controls overall operation of the ranging apparatus 1 according to preloaded programs, for example. Moreover, the overall controller 103 can perform a control process according to an external control signal supplied from outside. The clock generator 104 generates one or more clock signals to be used in the ranging apparatus 1, on the basis of a reference clock signal supplied from outside. The light emission timing controller 105 generates a light emission control signal representing an emission timing according to a light emission trigger signal supplied from outside. The light emission control signal is supplied to the light source unit 2 and also to the ranging processor 101.

The pixel array 100 includes plural pixels 10, 10, . . . arrayed in a two-dimensional grid and each including a light detecting device. Operation of each of the pixels 10 is controlled by the pixel controller 102 that operates according to commands from the overall controller 103. For example, the pixel controller 102 can perform control to read pixel signals from the respective pixels 10 in each of blocks including (n×m) pixels 10 that are arranged as n pixels in a row direction and m pixels in a column direction. Moreover, the pixel controller 102 can read pixel signals from the respective pixels 10 by scanning the pixels 10 in the row direction and scanning the pixels 10 in the column direction in each of the blocks. The pixel controller 102 is not limited to such control processes, and can control each of the pixels 10 independently. The pixel signals read from the respective pixels 10 are supplied to the ranging processor 101.

The ranging processor 101 includes a converting section 110, a generating section 111, a signal processing section 112, a setting section 113, and a set value storing section 114.

The pixel signals read from the respective pixels 10 and output from the pixel array 100 are supplied to the converting section 110. Here, the pixel signals are read asynchronously from the respective pixels 10 and supplied to the converting section 110. In other words, the pixel signals are read from the light detecting devices at the timings of the detection of light by the respective pixels 10.

The converting section 110 converts the pixel signals supplied from the pixel array 100 into digital information. Specifically, the pixel signals supplied from the pixel array 100 are output at the timings of the detection of light by the light detecting devices included in the pixels 10 that correspond to the pixel signals. The converting section 110 converts the supplied pixel signals into time information representing the timings.

The generating section 111 generates a histogram based on the time information into which the pixel signals have been converted by the converting section 110. Here, the generating section 111 counts the time information on the basis of unit times d set by the setting section 113, and generates a histogram. Details of the histogram generating process carried out by the generating section 111 will be described later.

The signal processing section 112 performs a predetermined calculation process based on the data of the histogram generated by the generating section 111, and calculates distance information, for example. The signal processing section 112 generates a curve approximating the histogram, on the basis of the data of the histogram generated by the generating section 111, for example. The signal processing section 112 can detect a peak of the curve approximating the histogram and determine the distance D on the basis of the detected peak.

When the histogram is approximated by a curve, the signal processing section 112 can perform a filtering process on the curve that approximates the histogram. For example, the signal processing section 112 can perform a low-pass filtering process on the curve that approximates the histogram, thereby suppressing a noise component. The signal processing section 112 performs the filtering process on the basis of filter coefficients set by the setting section 113.

The distance information obtained by the signal processing section 112 is supplied to the interface 106. The interface 106 outputs the distance information supplied from the signal processing section 112 as output data to outside. The interface 106 may include an MIPI (Mobile Industry Processor Interface), for example.

The set value storing section 114 stores one or more items of ranging condition information to be used by the ranging apparatus 1 when it carries out a ranging process. The ranging condition information includes setting information including information representing unit time d used when the generating section 111 generates a histogram and filter coefficients used by the signal processing section 112 in a filtering process and information for setting ranging patterns, for example. The ranging condition information stored by the set value storing section 114 can be rewritten under the control of the overall controller 103 according to an external control signal, for example.

The setting section 113 reads the ranging condition information from the set value storing section 114 under the control of the overall controller 103, for example, and sets parameters for the generating section 111 and the signal processing section 112 on the basis of the read ranging condition information.

Incidentally, the distance information obtained by the signal processing section 112 is output to outside through the interface 106, as described above. However, the present disclosure is not limited to such an example. Specifically, histogram data representing the data of the histogram generated by the generating section 111 may be output to outside through the interface 106. In this case, the information representing the filter coefficients may be omitted from the ranging condition information set by the setting section 113. The histogram data output from the interface 106 is supplied to an external information processing apparatus, for example, and appropriately processed.

Figure 5:
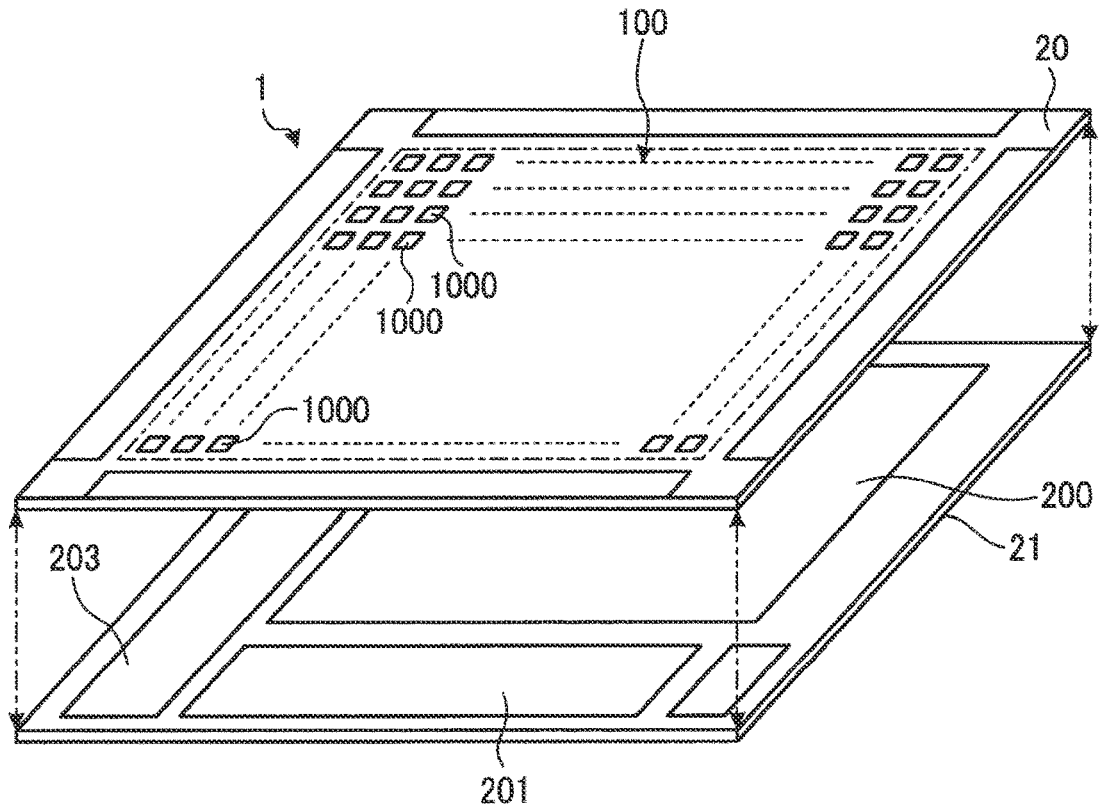
FIG. 5 is a schematic view illustrating an example of the configuration of devices applicable to the ranging apparatus according to the embodiments.

FIG. 5 is a schematic view illustrating an example of the configuration of devices applicable to the ranging apparatus 1 according to the embodiments. In FIG. 5, the ranging apparatus 1 includes a light detecting chip 20 and a logic chip 21 that are each fabricated as a semiconductor chip and are laminated together. Note that, in FIG. 5, the light detecting chip 20 and the logic chip 21 are illustrated as being separate from each other for illustrative purposes.

The light detecting chip 20 has light detecting devices 1000 included in the respective pixels 10 and arrayed in a two-dimensional grid in the region of the pixel array 100. The logic chip 21 has a logic array 200 including a signal processor for processing signals acquired by the light detecting devices 1000. The logic chip 21 may further include a signal processing circuit 201 disposed closely to the logic array 200, for processing signals acquired by the light detecting devices 1000, and a device controller 203 disposed closely to the logic array 200, for controlling operation of the ranging apparatus 1.

For example, the signal processing circuit 201 may include the ranging processor 101 described above. Further, the device controller 203 may include the pixel controller 102, the overall controller 103, the clock generator 104, the light emission timing controller 105, and the interface 106 described above.

Note that the structure of the light detecting chip 20 and the logic chip 21 is not limited to the above example. Moreover, the device controller 203 may be disposed closely to the light detecting devices 1000, for example, for driving and controlling devices other than the logic array 200. The device controller 203 may be disposed in any regions of the light detecting chip 20 and the logic chip 21 and have any functions, instead of being disposed in the layout illustrated in FIG. 5.

Figure 6:
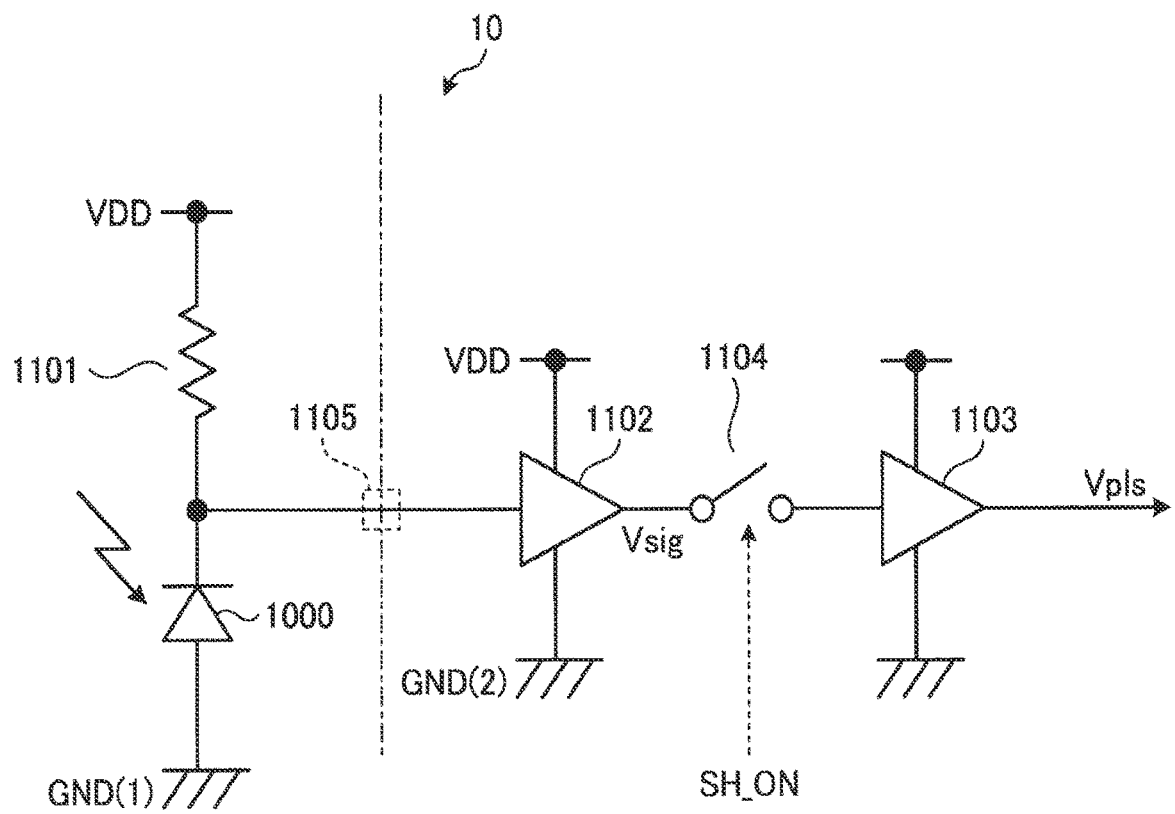
FIG. 6 is a diagram illustrating the configuration of an example of a pixel applicable to the embodiments.

FIG. 6 is a diagram illustrating the configuration of an example of a pixel 10 applicable to the embodiments. In FIG. 6, the pixel 10 includes a light detecting device 1000, a resistor 1101, an inverter 1102, an amplifier 1103, and a switch 1104.

The light detecting device 1000 converts applied light into an electric signal by way of photoelectric conversion and outputs the electric signal. In the embodiments, the light detecting device 1000 converts an applied photon into an electric signal by way of photoelectric conversion and outputs a pulse depending on the applied photon. In the embodiments, a single photon avalanche diode is used as the light detecting device 1000. The single photon avalanche diode will hereinafter be referred to as a SPAD (Single Photon Avalanche Diode). The SPAD has such characteristics that, when one photon is applied to the SPAD while a negative voltage large enough to cause avalanche multiplication is being applied to the cathode of the SPAD, electrons are generated and undergo avalanche multiplication, causing a large current to flow. Using the characteristics of the SPAD, the application of one photon to the SPAD can be detected with high sensitivity.

In FIG. 6, the light detecting device 1000 as the SPAD has a cathode connected to a terminal at a power supply potential VDD through the resistor 1101 and an anode connected to a terminal at a potential GND(1) lower than the power supply potential VDD. The terminal at the potential GND(1) may be a ground terminal, for example. The light detecting device 1000 is thereby reverse-biased. Further, a photocurrent flows in a direction from the cathode to anode of the light detecting device 1000.

Note that, the light detecting device 1000 is not limited to a SPAD. An avalanche photodiode (APD) or an ordinary photodiode is also applicable to the light detecting device 1000.

The resistor 1101 has a terminal connected to the power supply potential VDD and another terminal connected to the cathode of the light detecting device 1000. Each time the light detecting device 1000 detects a photon applied thereto, a photocurrent flows through the resistor 1101, causing the cathode potential of the light detecting device 1000 to drop to a value in an initial state that is lower than the power supply potential VDD (quenching operation).

A signal taken from the junction between the resistor 1101 and the cathode of the light detecting device 1000 is input to the inverter 1102. The inverter 1102 inverts the input signal at the cathode potential of the light detecting device 1000, and supplies an inverted output signal Vsig to the amplifier 1103 through the switch 1104 that is controlled to be turned on and off by a control signal SH_ON. The amplifier 1103 shapes the inverted output signal Vsig into a pulse Vpls and outputs the pulse Vpls. Further, the inverter 1102 and the amplifier 1103 are connected to a ground potential GND(2) that is different from the ground potential GND(1) to which the anode of the light detecting device 1000 is connected.

Note that, in FIG. 6, the light detecting device 1000 and the resistor 1101 are fabricated on the light detecting chip 20. In addition, the inverter 1102, the amplifier 1103, and the switch 1104 are fabricated on the logic chip 21. The junction between the resistor 1101 and the cathode of the light detecting device 1000 and the input terminal of the inverter 1102 are connected to each other through a coupling 1105, which may be a CCC (Copper-Copper Connection), for example, between the light detecting chip 20 and the logic chip 21.

First Embodiment

Figure 7:
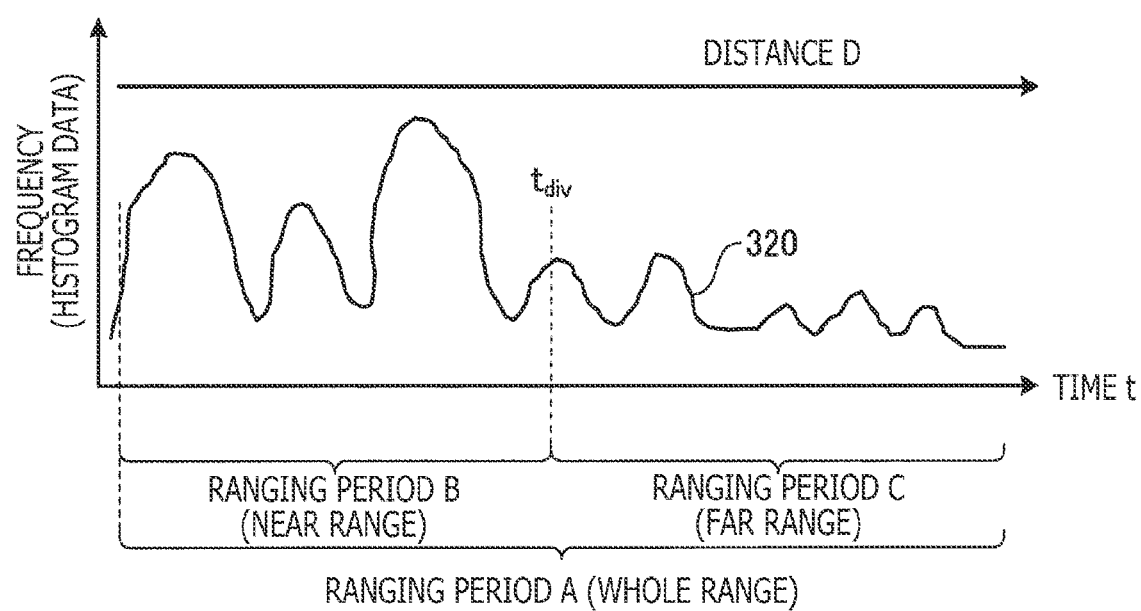
FIG. 7 is a diagram illustrating an example of a histogram based on points of time at which light is detected by each pixel.

Next, a ranging process according to a first embodiment will be described. FIG. 7 is a diagram illustrating an example of a histogram based on points of time at which light is detected by each pixel 10. Note that the histogram, denoted by 320 in FIG. 7, is approximated by a curve, and has a horizontal axis representing time t.

In FIG. 7, it is assumed that the left end represents time $t_0$ as an emission timing at which the light source unit 2 emits light, for example. The detection timing lags increasingly in a rightward direction, indicating that the light emitted from the light source unit 2 is reflected at farther distances. In other words, the distance D up to the measurand is larger increasingly in the rightward direction in FIG. 7.

Division time $t_{div}$ is set here with respect to the exposure time of each pixel 10. The exposure time may depend on the distance as the upper limit of the range that the ranging apparatus 1 can measure, for example, in common with the pixels 10. Division time $t_{div}$ is set to a value within the exposure time. A period from time $t_0$ as the emission timing at which the light source unit 2 emits light to a point of time immediately prior to division time $t_{div}$ is referred to as a ranging period B, whereas a period subsequent to division time $t_{div}$ (inclusive of the division time $t_{div}$) is referred to as a ranging period C. For example, the ranging period C represents a period from division time $t_{div}$ to the end of the exposure time of each pixel 10. Furthermore, a period from time $t_0$ as the emission timing at which the light source unit 2 emits light to the end of the exposure time of each pixel 10 is referred to as a ranging period A.

The ranging period B is a period in which distances close to the ranging apparatus, i.e., predetermined distances from the ranging apparatus 1, are ranged, and an environment including the measurand in the ranging period B is referred to as a "near range." On the other hand, an environment in the ranging period C is referred to as a "far range," and an environment in the ranging period A is referred to as a "whole range."

The ranging apparatus 1 according to the first embodiment performs a ranging process by applying different ranging conditions in the ranging periods A, B, and C. For example, the ranging apparatus 1 generates histograms based on different unit times d in the ranging periods A, B, and C. Alternatively, different unit times d may be applied to the ranging period B and the ranging periods A and C. Furthermore, the ranging apparatus 1 performs the ranging process at different timings in the ranging periods A, B, and C.

Now, it is assumed that a ranging process is carried out only on the ranging period A (whole range) without dividing the exposure period of each pixel 10. Setting shorter unit times d for generating a histogram makes it possible to acquire finer peaks for the histogram and to thereby acquire detailed distance information.

In this case, if longer unit times d are set throughout the ranging period A, then the number of bins in a histogram increases, resulting in a large number of data to be processed and a large number of data to be stored for processing. Further, since the number of peaks themselves to be stored or indicated outside increases, the number of data to be output per ranging process increases. The increased number of data to be processed causes an increase in the circuit scale (electric power consumption) and an increase in the processing time.

Moreover, in the near range and the far range, the peaks in an acquired histogram may possibly be different qualitatively. For example, it is considered that many large peaks will be acquired in the near range and small peaks will be acquired with a noise component at a large ratio in the far range. Thus, a complex algorithm is required to detect peaks in the near range and peaks in the far range on the basis of a histogram generated throughout the ranging period A. In addition, a large-scale circuit is required to process the complex algorithm, and a large electric power consumption is also required by the large-scale circuit.

Inasmuch as the ranging apparatus 1 according to the first embodiment can perform a ranging process by applying different ranging conditions in the respective ranging periods A, B, and C, the ranging process is simplified, and the circuit scale and the electric power consumption are reduced. The ranging process according to the first embodiment will be described below with reference to FIG. 8.

Figure 8:
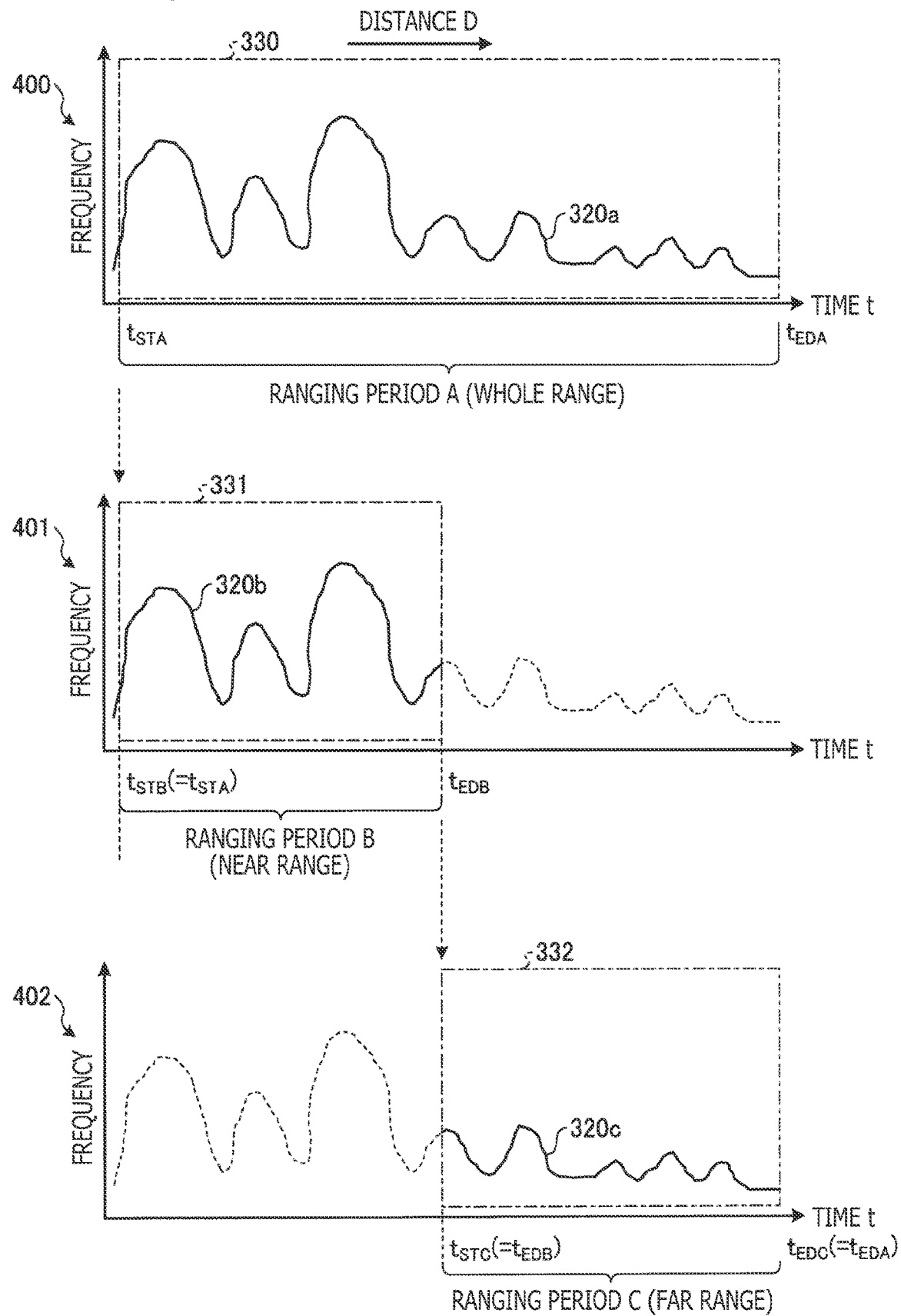
FIG. 8 is a diagram illustrating an example of ranging periods according to the first embodiment.

FIG. 8 is a diagram illustrating an example of ranging periods according to the first embodiment. In FIG. 8, a chart 400 illustrates an example in which the ranging period A (whole range) is used as a ranging target. In the chart 400, ranging start time $t_{STA}$ is identical to or extremely close to time to as the emission timing at which the light source unit 2 emits light, for example. Ranging end time $t_{EDA}$ in the ranging period A is represented by the end of the exposure time of each pixel 10, for example. In the ranging process during the ranging period A, the ranging apparatus 1 counts detection time $t_m$ at which the light is detected at each pixel 10 within a range 330 from ranging start time $t_{STA}$ to ranging end time $t_{EDA}$, on the basis of first unit time d (referred to as unit time $d_1$), and generates a histogram 320a.

In FIG. 8, a chart 401 is a diagram illustrating an example of a case in which the ranging period B (near range) is used as a ranging target. In the chart 401, ranging start time $t_{STB}$ is identical to or extremely close to time to as the emission timing at which the light source unit 2 emits light, for example. Ranging end time $t_{EDB}$ of the ranging period B is represented by division time $t_{div}$ set with respect to detection time $t_m$ as the boundary between the ranging period B and the ranging period C. In the ranging process during the ranging period B, the ranging apparatus 1 counts detection time $t_m$ at which the light is detected at each pixel 10 within a range 331 from ranging start time $t_{STB}$ to ranging end time $t_{EDB}$, on the basis of second unit time d (referred to as unit time $d_2$) higher than first unit time $d_1$, and generates a histogram 320b indicated by the solid-line curve in the chart 401.

Further, after the ranging in the ranging period B has been ended, the ranging apparatus 1 stops the ranging process. The manner in which the ranging apparatus 1 stops the ranging process after the ranging in the ranging period B has been ended is illustrated by the dotted-line curve in the histogram in the chart 401. For example, the ranging apparatus 1 ignores and does not count detection time $t_m$ at which the light is detected at each pixel 10 after the ranging period B has been ended. Alternatively, the ranging apparatus 1 may stop supplying electric power to each of the pixels 10 after the ranging period B has been ended, thereby stopping the ranging process.

In FIG. 8, a chart 402 is a diagram illustrating an example of a case in which the ranging period C (far range) is used as a ranging target. In the chart 402, ranging start time $t_{STC}$ is represented by ranging end time $t_{EDB}$ of the above ranging period B, i.e., division time $t_{div}$, for example. Ranging end time $t_{EDC}$ of the ranging period C is represented by the end of the exposure period of each pixel 10, for example. In this example, the ranging end time $t_{EDC}$ of the ranging period C is identical to ranging end time $t_{EDA}$ of the ranging period A described above. In the ranging process during the ranging period C, the ranging apparatus 1 counts detection time $t_m$ at which the light is detected at each pixel 10 within a range 332 from ranging start time $t_{STC}$ to ranging end time $t_{EDC}$, on the basis of third unit time d (referred to as unit time $d_3$) longer than second unit time $d_2$, and generates a histogram 320c indicated by the solid-line curve in the chart 402.

Note that, unit time $d_3$ may be as long as unit time $d_1$ in the ranging period A, may be longer than unit time $d_2$ but shorter than unit time $d_1$, or longer than unit time $d_1$.

As with the ranging period B described above, the ranging apparatus 1 stops the ranging process until the ranging in the ranging period C starts. The manner in which the ranging apparatus 1 stops the ranging process before the ranging in the ranging period C starts is illustrated by the dotted-line curve in the histogram in the chart 402. For example, the ranging apparatus 1 ignores and does not count detection time $t_m$ at which the light is detected at each pixel 10 during a period (corresponding to the ranging period B) from time to at the emission timing of the light source unit 2 to ranging start time $t_{STC}$ of the ranging period C. Alternatively, the ranging apparatus 1 may stop supplying electric power to each of the pixels 10 until ranging start time $t_{STC}$ of the ranging period C, thereby stopping the ranging process. In this case, the ranging apparatus 1 starts supplying electric power to each pixel 10 at ranging start time $t_{STC}$.

According to the first embodiment, as described above, in the ranging process during the ranging period B (near range), the ranging apparatus 1 uses unit time $d_2$ shorter than unit time $d_1$ used in the ranging process during the ranging period C (far range), in order to count detection time $t_m$.

Specifically, in the near range, it is considered that the motion of the measurand as viewed from the ranging apparatus 1 is faster and the number of detected photons is larger, compared with the case of the far range. In the near range (the ranging period B), it is thus preferable to count detection time $t_m$ by using shorter unit times. In the far range, on the other hand, it is considered that the motion of the measurand as viewed from the ranging apparatus 1 is slower and the number of detected photons is smaller, compared with the case of the near range. In the far range (the ranging period C), it is thus preferable to count detection time $t_m$ by using longer unit times.

Moreover, in the case of the near range, the histogram 320$b$ contains many large peaks and is less liable to be affected by noises. Thus, it is enough to perform a weaker filtering process on a curve approximating the histogram 320$b$, in determining peaks on the basis of the approximating curve. On the other hand, in the case of the far range, the histogram 320$c$ contains smaller large peaks than in the case of the near range and is more liable to be affected by noises. Thus, it is preferable to perform a stronger filtering process on a curve approximating the histogram 320$c$, in determining peaks on the basis of the approximating curve.

Incidentally, in the whole range (the ranging period A), if unit times d are shortened for counting detection time $t_m$, then the number of bins in a histogram increases, resulting in a large number of data to be processed and a large number of data to be stored for processing, as described above. Accordingly, in the whole range, unit times $d_1$ longer than unit times $d_2$ in the near range, for example, are used to count detection time $t_m$.

The ranging process in the whole range may be carried out in combination with at least the ranging process in the near range among the ranging process in the near range and the ranging process in the far range. For example, it may be determined whether the ranging processes in the near range and the far range are to be performed on the basis of the histogram 320$a$ in the whole range or not. Further, division time $t_{div}$ may be set on the basis of the histogram 320$a$ in the whole range.

Figure 9:
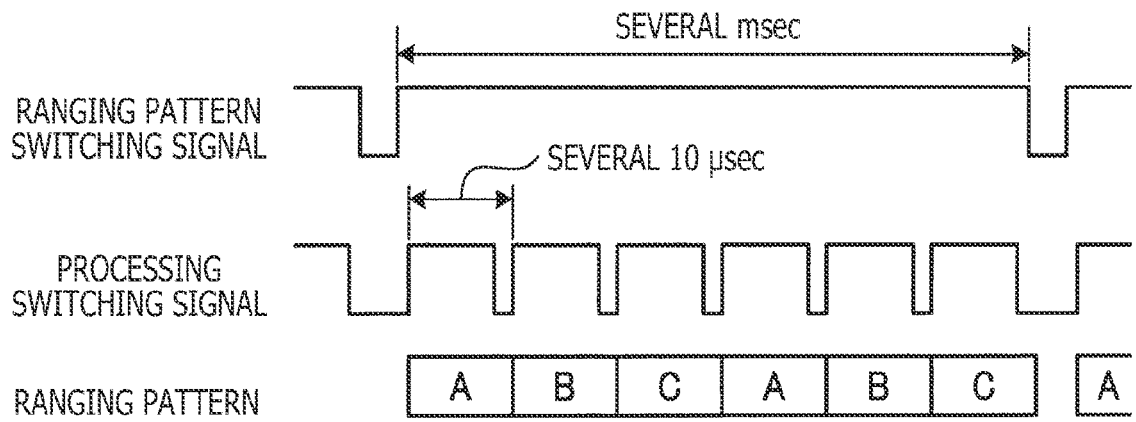
FIG. 9 is a diagram that is illustrative of a ranging process according to the first embodiment.

The ranging apparatus 1 according to the first embodiment performs ranging in a pattern represented by a combination of ranging processes under different ranging conditions as described above. FIG. 9 is a diagram that is illustrative of a ranging process according to the first embodiment. In FIG. 9, time passes in a rightward direction. Further, FIG. 9 illustrates a ranging pattern switching signal, a processing switching signal, and ranging patterns, successively from above. The ranging pattern switching signal and the processing switching signal are generated by the overall controller 103 and supplied to the ranging processor 101, for example.

Each of the ranging patterns represents a sequence in which different ranging processes are successively carried out and the lengths of the respective ranging processes. In FIG. 9 and subsequent similar figures, the ranging processes that correspond to the above ranging periods A, B, and C are denoted by A, B, and C, respectively. Hereinafter, unless particularly stated otherwise, the ranging processes that correspond to the ranging periods A, B, and C will be referred to as the ranging processes A, B, and C. For example, the ranging process B represents a process for counting detection time $t_m$ at which the light is detected at each pixel 10 during the period from ranging start time $t_{STB}$ to ranging end time $t_{EDB}$ with respect to time to as an emission timing at which the light source unit 2 emits light, using unit times $d_2$ as units, and generating the histogram 320$b$.

The processing switching signal represents a signal corresponding to a processing unit that is a shortest period of time in which a ranging process is carried out in one ranging period. In the example illustrated in FIG. 9, the processing unit of the processing switching signal represents a period from a positive-going edge to a next positive-going edge of the signal. The length of the processing unit represents a period of time such that in a case where the ranging processes corresponding to different ranging periods, e.g., the ranging periods B and C, are successively performed on the same measurand during the times of the processing units, the difference between the results of the ranging processes in the ranging periods B and C is regarded as negligible. The length of the processing unit may be several 10 [μsec.], for example.

In FIG. 9, a ranging process is carried out during the period of a high state of the processing switching signal, and the period of a low state of the processing switching signal represents a period for switching to a next ranging process.

The ranging pattern switching signal represents a signal indicating a switching timing for switching between ranging patterns each representing a combination of different ranging processes that are successively carried out. In the example illustrated in FIG. 9, the period from a positive-going edge to a next negative-going edge of the signal represents the period of one ranging pattern. Further, a negative-going edge of the signal represents a switching timing for switching between ranging patterns, and one of the ranging patterns switches to the other ranging pattern during a period from the above negative-going edge to a next positive-going edge of the signal. The length of the period of one ranging pattern may be several [msec.], for example.

In the example illustrated in FIG. 9, one ranging pattern includes a combination of ranging processes including the ranging process A in one processing unit, the ranging process B in one processing unit, and the ranging process C in one processing unit that are successively carried out in two repetitive cycles. The ranging apparatus 1 sets the ranging pattern while the ranging pattern switching signal is in a low state.

Settings and a switching process in the ranging apparatus 1 will be described more specifically below with reference to FIG. 4. In the ranging apparatus 1, the set value storing section 114 stores in advance ranging condition information including information representing one or more ranging patterns and setting information applied to the ranging processes. The information representing ranging patterns includes information representing the sequence and lengths of the ranging processes (e.g., the ranging processes A, B, and C). Further, the setting information applied to the ranging processes includes information representing unit time d for counting detection time $t_m$ for generating a histogram and filter coefficients of a filtering process to be performed on a generated histogram.

In the ranging apparatus 1, the setting section 113 reads the information indicating the ranging processes to be applied from the set value storing section 114, during the period in which the ranging pattern switching signal is in a low state under the control of the overall controller 103. The setting section 113 sets a sequence and lengths of ranging processes for the generating section 111 on the basis of the read information.

Further, the setting section 113 reads the setting information to be applied to a ranging process that is to be performed in a next processing unit from the set value storing section 114, during the period in which the processing switching signal is in a low state under the control of the overall controller 103. The setting section 113 sets unit time d and filter coefficients to be applied to the next ranging process, for the generating section 111 and the signal processing section 112, on the basis of the read information.

In the example illustrated in FIG. 9, the setting section 113 reads information of a ranging pattern to be performed from the set value storing section 114, during the period in which the ranging pattern switching signal is in a first low state under the control of the overall controller 103. Here, the setting section 113 reads, from the set value storing section 114, information of a ranging pattern that includes a combination of ranging processes including the ranging process A in one processing unit, the ranging process B in one processing unit, and the ranging process C in one processing unit that are successively carried out in two repetitive cycles, as illustrated in a lower portion of FIG. 9.

Further, the setting section 113 reads setting information to be applied to a next ranging process from the set value storing section 114, during each period in which the processing switching signal is in a low state according to the sequence of ranging processes and the lengths of the respective ranging processes that are represented by the information of the ranging pattern read from the set value storing section 114. The setting section 113 sets unit time d for the generating section 111 and sets filter coefficients for the signal processing section 112 on the basis of the read setting information.

More specifically, in the example illustrated in FIG. 9, the setting section 113 reads setting information to be applied to the ranging process A from the set value storing section 114, during the period in which the processing switching signal is in a first low state, on the basis of the information of the ranging pattern. The setting section 113 sets unit time $d_1$ and filter coefficients corresponding to the ranging process A, for the generating section 111 and the signal processing section 112, on the basis of the read setting information, during the period in which the processing switching signal is in the low state.

The setting section 113 reads setting information to be applied to the ranging process B, during the period in which the processing switching signal is in a next low state, on the basis of the information of the ranging pattern, and sets unit time $d_2$ and filter coefficients corresponding to the ranging process B for the generating section 111 and the signal processing section 112, on the basis of the read setting information.

Subsequently, the setting section 113 similarly reads setting information to be applied to a next ranging process based on the information of the ranging pattern and sets unit time d and filter coefficients for the generating section 111 and the signal processing section 112 on the basis of the read setting information, successively, during the periods in which the processing switching signal is in a low state. The setting section 113 repetitively performs this process until the final ranging process (the second ranging process C in the example illustrated in FIG. 9) represented by the information of the ranging pattern is carried out.

Figure 10:
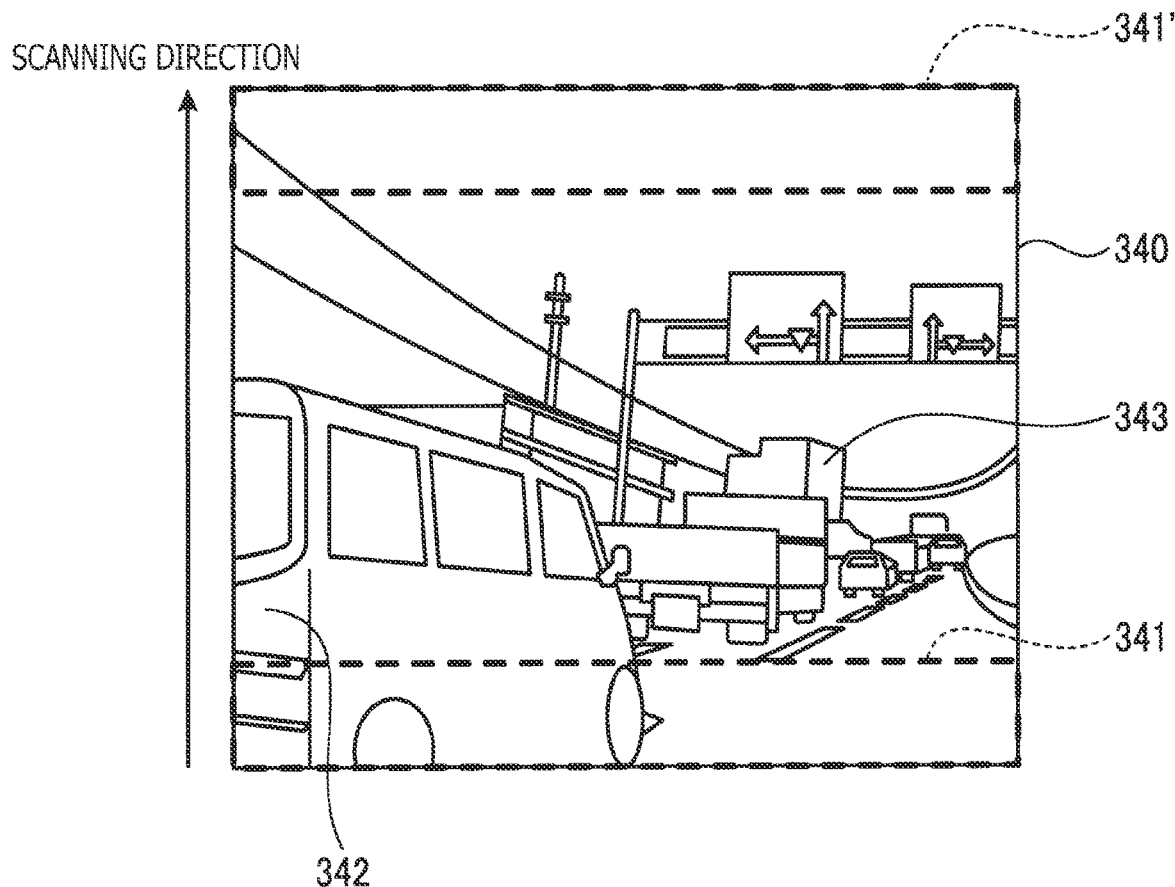
FIG. 10 is a diagram schematically illustrating an example of a ranging process carried out by a pixel array in its entirety, the ranging process being applicable to the first embodiment.

FIG. 10 is a diagram schematically illustrating an example of a ranging process carried out by the pixel array 100 in its entirety, applicable to the first embodiment. In FIG. 10, an area 340 corresponds to the pixel array 100 and schematically illustrates a whole range acquired by the pixels 10 included in the pixel array 100.

As described above, in the ranging apparatus 1, the pixel controller 102 can perform control to read pixel signals from the respective pixels 10 included in the pixel array 100 in each of blocks including (n×m) pixels 10. In this case, in the ranging apparatus 1, the ranging processor 101 counts detection time $t_m$ at each of the pixels 10 included in each of the blocks, on the basis of the (n×m) pixel signals read per block, and generates a histogram in the block.

The pixel controller 102 successively switches from block to block in the row direction so as not to include overlapping pixels 10 thereby horizontally scanning the pixel array 100 as indicated by an area 341 in FIG. 10. The pixel controller 102 switches from horizontally scanned area to horizontally scanned area in the column direction so as not to include overlapping pixels 10, thereby vertically scanning the pixel array 100. In the example illustrated in FIG. 10, vertical scanning of the pixel array 100 starts from the lower end of the area 340 and ends at the upper end of the area 340 as indicated by an area 341' in FIG. 10.

The area 340 is scanned in its entirety in each of the ranging processes included in the ranging pattern. In the example illustrated in FIG. 9, the area 340 is scanned in its entirety in each of the ranging processes A, B, and C included in the ranging pattern. For example, when the area 341 is scanned, since a measurand 342 is present in the near range, it is considered that many strong peaks are detected in the near range in the ranging process B. On the other hand, in the area 341', almost no measurand is present in the near and far ranges (though a measurand 343 in the far range is indicated in the example illustrated in FIG. 10, the measurand 343 is present outside of the area 341'). Thus, it is considered that the ranging process C produces a detection result containing many noises.

Note that, the pixel controller 102 has been described above as reading pixel signals from each of the blocks including (n×m) pixels 10, but the present disclosure is not limited to such an example. The pixel controller 102 may perform control to read pixel signals from each row of pixels 10 in the pixel array 100, for example. In this case, the pixel controller 102 controls the pixel array 100 to read pixel signals simultaneously from all the pixels 10 arrayed in a row as a reading target, for example. The pixel controller 102 may also control the pixel array 100 to read pixel signals en masse from plural rows of pixels 10.

Moreover, the set value storing section 114 can store coefficients used for ranging processes per unit (block unit, row unit, pixel unit, etc.) for reading pixel signals. In this case, the setting section 113 reads coefficients from the set value storing section 114 per reading unit, and sets them for the generating section 111 and the signal processing section 112. The coefficients may include filter coefficients for use in filtering processes performed by the signal processing section 112. Further, in the case of performing control to read pixel signals per row, one row may be divided into plural blocks, and the set value storing section 114 may store coefficients per each of the blocks into which the row is divided. The setting section 113 may read coefficients from the set value storing section 114 per each of the blocks into which the row is divided, and set them for the generating section 111 and the signal processing section 112.

Now, the relation between the length of a processing unit and the scanning of the pixel array 100 will be considered. Providing an upper-limit distance as a ranging target is 100 [m], for example, the period of time Δt representing the difference between time $t_1$ and time $t_0$ is determined from the equation (1) described above according to the following equation (2):

$$\Delta t = t_1 - t_{0=D}/(c/2) \approx 0.67 [\mu sec.] \quad (2)$$

Now, if the length T of the processing unit is T=50 [μsec.], then the number of times that measurements can be made is determined according to the following equation (3):

$$T/\Delta t = 50/0.67 \approx 74.6 [times] \quad (3)$$

It can be recognized from the equation (3) that, providing an upper-limit distance as a ranging target is 100 [m], it is possible to make approximately 70 measurements in one processing unit. Thus, by dividing the pixel array 100 into approximately 70 blocks and scanning them horizontally and vertically as described above, for example, it is possible to perform the ranging processes A, B, and C in each processing unit.

(Comparison with an Existing Technology)

Figure 11:
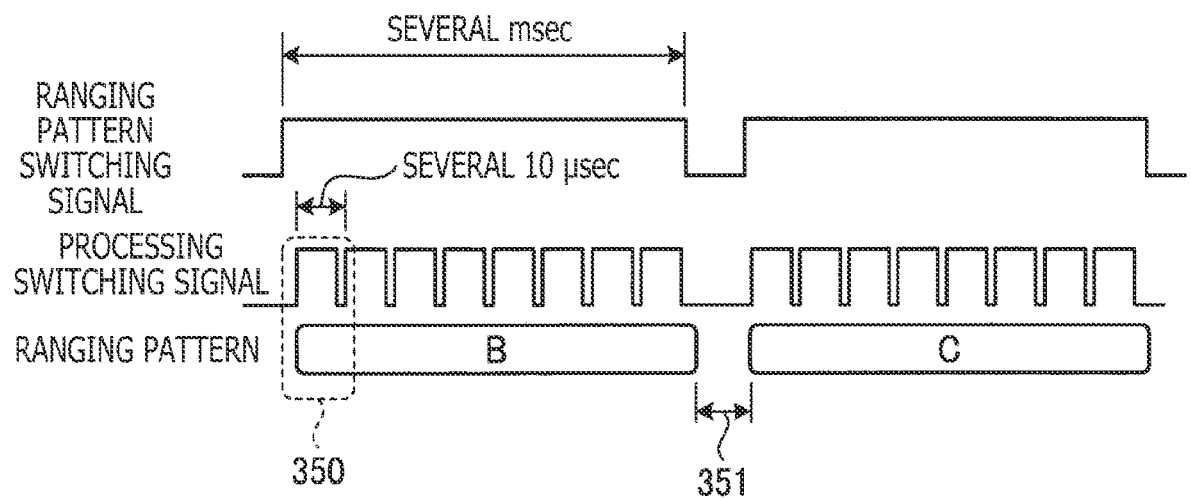
FIG. 11 is a diagram that is illustrative of a ranging process according to an existing technology.

A process according to the first embodiment and a process according to an existing technology will be compared here with each other. FIG. 11 is a diagram that is illustrative of a ranging process according to an existing technology. The diagram illustrated in FIG. 11 corresponds to FIG. 9 described above, and its details have the same meanings as those illustrated in FIG. 9 and will be omitted from description here.

According to the existing technology, switching between ranging patterns is carried out via communication with an external host apparatus. Since a certain period of time is taken to perform a communication process in this case, settings for switching between the ranging process B for ranging in the near range and the ranging process C for ranging in the far range, for example, are made during a period 351 where enough time is available and in which the ranging pattern switching signal is in a low state. Since it takes a long time for the ranging process B to switch to the following ranging process C, in a case where the measurand is a moving body or the ranging apparatus is incorporated in a mobile body such as a vehicle, ranging cannot be performed under the same conditions, and simultaneity may possibly be impaired.

On the other hand, in order to secure simultaneity for ranging, the ranging processes in the near range and the far range may be carried out simultaneously in one processing unit indicated by a dotted frame 350 in FIG. 11, for example. For achieving accuracy in the near range in its entirety in this case, it is necessary to count detection time $t_m$ in unit times d for the near range in the overall whole range, for example. In this case, it is necessary to process a huge amount of data and to carry out complex algorithms.

In contrast, the ranging apparatus 1 according to the first embodiment has incorporated therein plural items of ranging condition information for setting different ranging processes. Consequently, it is possible to switch between ranging processes quickly, making it possible to perform ranging processes depending on distances up to measurands while securing simultaneity for ranging. Furthermore, since the ranging apparatus 1 according to the first embodiment can perform ranging processes depending on distances, the amounts of data in the respective ranging processes are reduced, and the algorithms for the ranging processes are simplified.

Modification of the First Embodiment

Next, a modification of the first embodiment of the present disclosure will be described below. According to the first embodiment described above, the ranging process A for the whole range is divided into the ranging process B for the near range and the ranging process C for the far range which do not overlap each other. On the other hand, the modification of the first embodiment represents an example in which plural ranging processes including overlapping portions are provided.

Figure 12:
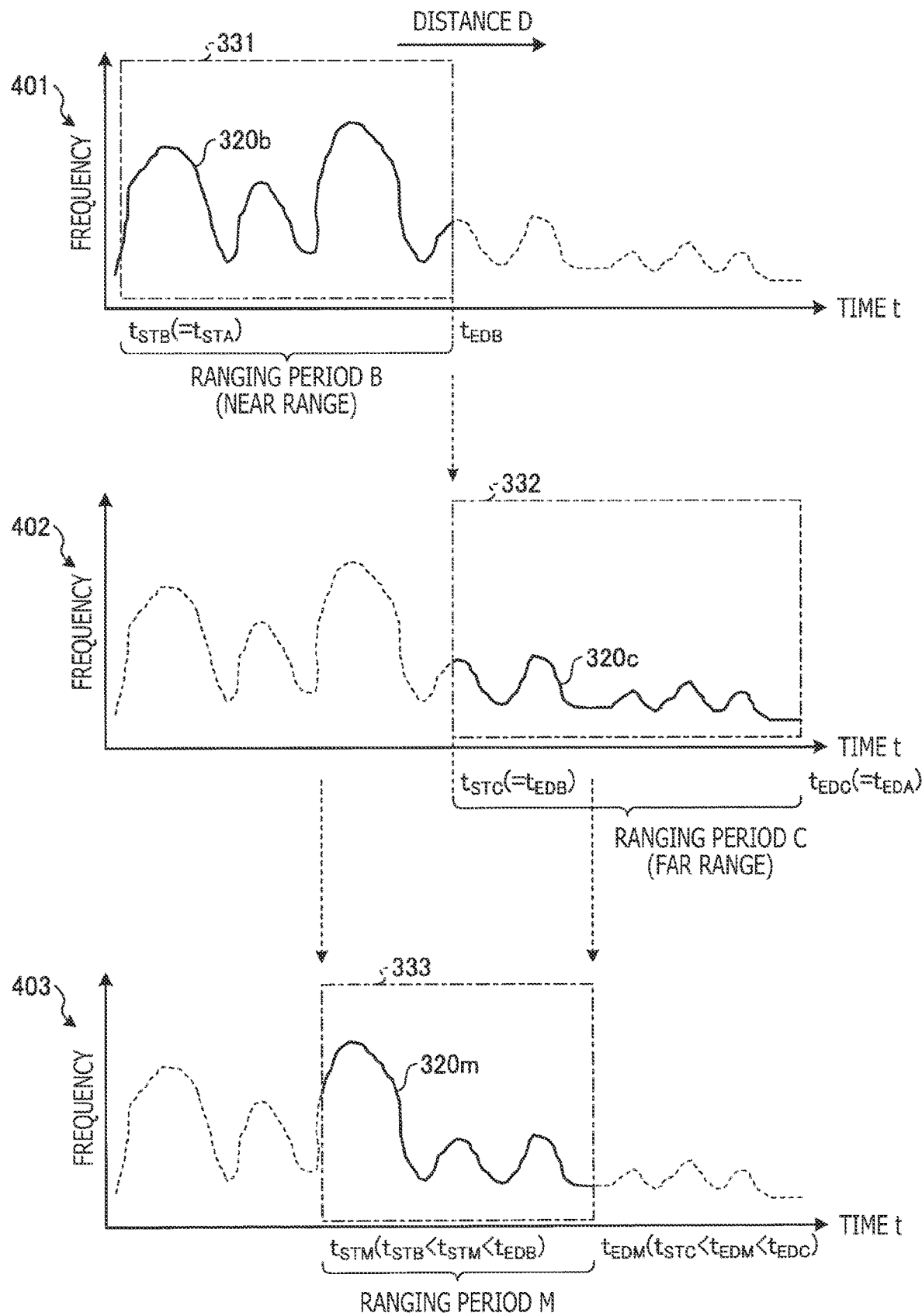
FIG. 12 is a diagram illustrating an example of ranging periods according to a modification of the first embodiment.

FIG. 12 is a diagram illustrating an example of ranging periods according to the modification of the first embodiment. In FIG. 12, charts 401 and 402 are reprints of charts 401 and 402 illustrated in FIG. 8, and respectively represent the ranging period B for the near range and the ranging period C for the far range. As described above, ranging end time $t_{EDB}$ of the ranging period B agrees with ranging start time $t_{STC}$ of the ranging period C, and the ranging period B and the ranging period C do not overlap each other.

According to the modification of the first embodiment, further, as indicated in a chart 403 in FIG. 12, there is provided a ranging period M that overlaps a latter half of the ranging period B and a former half of the ranging period C. More specifically, the ranging period M has ranging start time $t_{STM}$ between ranging start time $t_{STB}$ of the ranging period B and ranging end time $t_{EDB}$ thereof ($t_{STB} < t_{STM} < t_{EDB}$), as represented by a range 333 in the chart 304. The ranging period M has ranging end time $t_{EDM}$ between ranging start time $t_{STC}$ of the ranging period C and ranging end time $t_{EDC}$ thereof ($t_{STC} < t_{ETM} < t_{EDC}$).

In the example illustrated in FIG. 12, the range 333 due to the ranging period M includes portions overlapping the range 331 due to the ranging period B and the range 332 due to the ranging period C, the ranging periods B and C being divided from the ranging period A of the whole range.

Further, it is considered that unit time $d_M$ for counting detection time $t_m$ in the ranging period M to generate a histogram 320m may be longer than unit time $d_2$ in the ranging period B but shorter than unit time $d_3$ in the ranging period C, for example. The present disclosure is not limited to such a detail, and the ranging period M may be regarded as a ranging period of interest and unit time $d_M$ in the ranging period M may be the shortest time among the ranging periods included in the ranging period A of the whole range.

According to the modification of the first embodiment, as described above, the ranging period M that has periods overlapping the other ranging periods is provided. Consequently, it is possible to perform ranging depending on distances with higher accuracy.

Second Embodiment

Next, a second embodiment of the present disclosure will be described below. The second embodiment represents an example in which a ranging apparatus 1 performs ranging by switching between plural ranging patterns. According to the second embodiment, the ranging apparatus 1 is able to store information of plural ranging patterns in a set value storing section 114.

Note that, since the arrangement of the ranging apparatus 1 described in the above first embodiment is applicable as it is to the second embodiment, the arrangement of the ranging apparatus 1 will be omitted from description.

Figure 13:
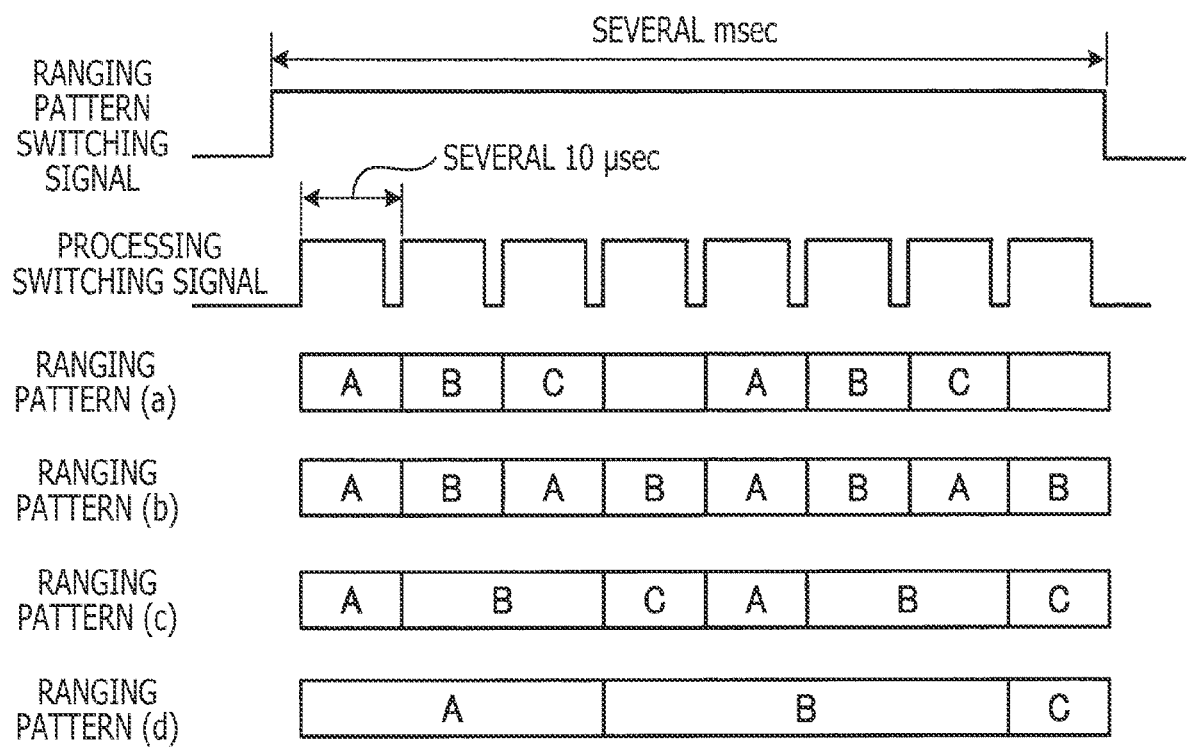
FIG. 13 is a diagram illustrating an example of plural ranging patterns stored in a set value storing section, the patterns being applicable to a second embodiment.

FIG. 13 illustrates an example of plural ranging patterns stored in the set value storing section 114, applicable to the second embodiment. In FIG. 13, a ranging pattern switching signal and a processing switching signal are similar to those in FIG. 9 described above, and hence will be omitted from description here. In FIG. 13, "A", "B", and "C" correspond respectively to the ranging processes A, B, and C described above, and represent the ranging processes for the whole range, the near range, and the far range. In FIG. 13, "X" represents a ranging process under ranging conditions further different from those for the ranging processes A, B, and C.

In the example of FIG. 13, four ranging patterns including ranging patterns (a) through (d) are illustrated. The ranging pattern (a) includes a combination of the ranging processes A, B, C, and X each in one processing unit that are successively carried out in two repetitive cycles. The ranging pattern (b) includes a combination of the ranging processes A and B each in one processing unit that are successively carried out in four repetitive cycles.

The ranging pattern (c) includes a combination of the ranging process A in one processing unit, the ranging process B in two processing units, and the ranging process C in one processing unit that are successively carried out in two repetitive cycles. The ranging pattern (c) makes it possible to perform ranging in the near range with higher accuracy, compared with the ranging pattern (a). Further, the ranging pattern (d) includes a combination of the ranging process A in three processing units, the ranging process B in four processing units, and the ranging process C in one processing unit that are successively carried out in two repetitive cycles. The ranging pattern (d) makes it possible to perform ranging in the near range with higher accuracy and to also perform ranging in the far range with high accuracy by combining the ranging process A and the ranging process C.

The set value storing section 114 stores ranging condition information including information for setting these ranging patterns (a) through (d). For example, as described above, the set value storing section 114 stores, with respect to the ranging patterns (a) through (d), information indicating sequences and lengths of ranging processes to be used among the ranging processes A, B, C, and X, in relation to information for identifying the ranging patterns (a) through (d).

Incidentally, the ranging patterns (a) through (d) illustrated in FIG. 13 are an example of plural ranging patterns, and the present disclosure is not limited to such an example.

Figure 14:
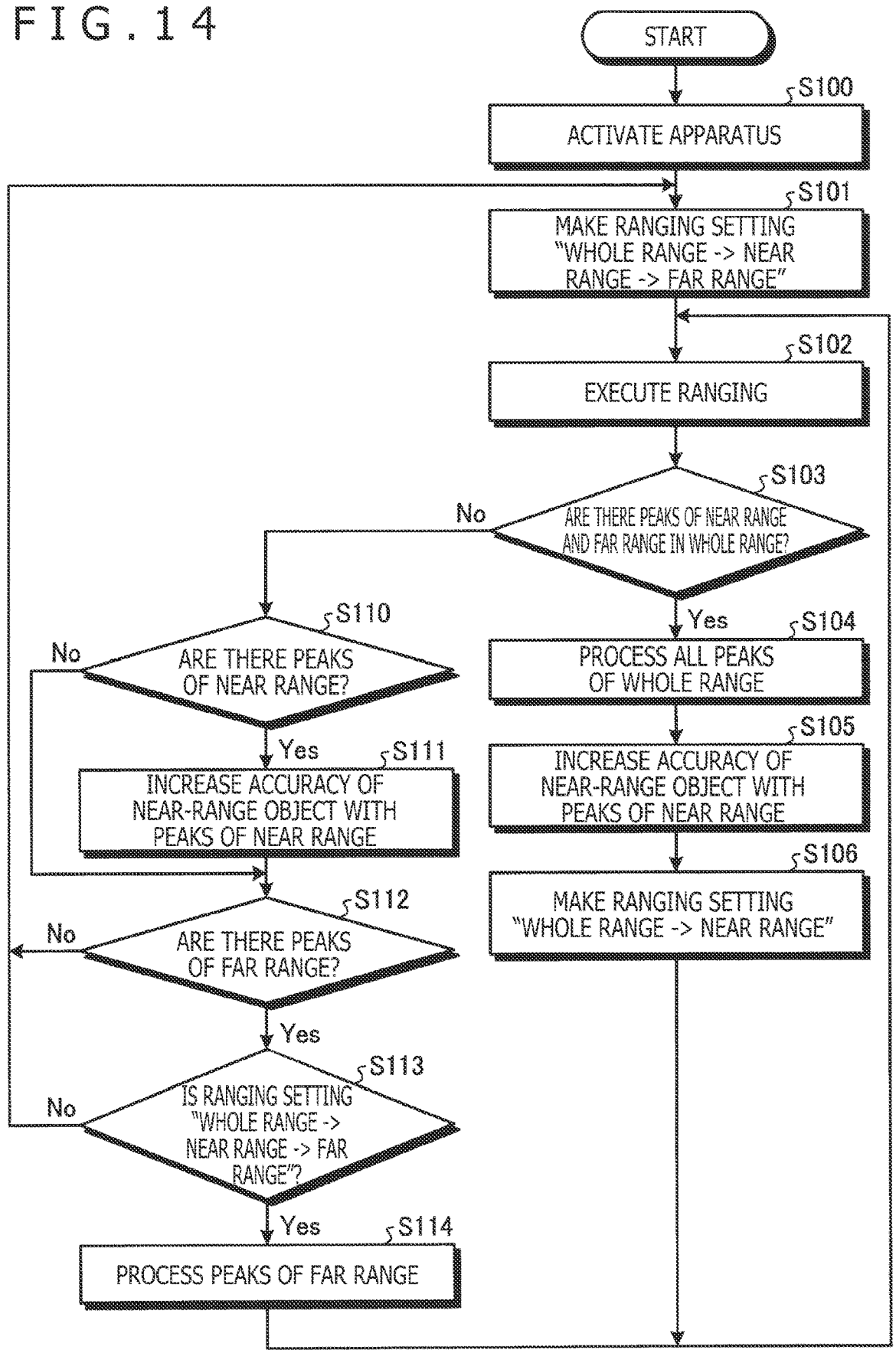
FIG. 14 is a flowchart of an example of ranging operation carried out by a ranging apparatus according to the second embodiment.

The ranging apparatus 1 according to the second embodiment continues ranging by switching between ranging patterns depending on the result of ranging according to one ranging pattern. FIG. 14 is a flowchart of an example of ranging operation carried out by the ranging apparatus 1 according to the second embodiment. The ranging apparatus 1 will be described here as using the ranging patterns (b) and (c) among the ranging patterns (a) through (d) described with reference to FIG. 13. The ranging apparatus 1 stores therein ranging condition information including respective information representing the ranging patterns (b) and (c) and respective information representing the ranging processes A, B, and C used in the ranging patterns (b) and (c).

In FIG. 14, when the ranging apparatus 1 is activated in step S100, the overall controller 103, for example, of the ranging apparatus 1 makes a ranging setting to perform ranging on the whole range, the near range, and the far range respectively as targets in step S101. In this example, the ranging apparatus 1 selects the ranging pattern (c) as a ranging pattern for performing ranging, and makes a ranging setting for the whole range, the near range, and the far range.

According to a more specific example, the setting section 113 of the ranging apparatus 1 reads the information representing the ranging pattern (c) from the set value storing section 114, under the control of the overall controller 103, and sets lengths, an execution sequence, and the number of repetitive cycles of the ranging processes A, B, and C for the generating section 111.

In next step S102, the ranging apparatus 1 executes ranging according to the ranging pattern that is currently being set. For example, immediately after control has gone from step S100 to step S101, the ranging apparatus 1 executes ranging according to the ranging pattern (c).

Specifically, the setting section 113 of the ranging apparatus 1 reads setting information of the ranging process A to be performed in a first processing unit during the period in which the processing switching signal is in a low state, according to a command from the overall controller 103, and sets unit time $d_1$ and filter coefficients for the generating section 111 and the signal processing section 112. The overall controller 103 performs the ranging process A during the period in which the processing switching signal is in a high state, and the ranging processor 101 generates a histogram regarding the whole range and detects peaks therein.

The setting section 113 reads setting information of the ranging process B to be performed in a next processing unit, during the period in which the processing switching signal is in a next low state, according to a command from the overall controller 103, and sets unit time $d_2$ and filter coefficients for the generating section 111 and the signal processing section 112. The overall controller 103 performs the ranging process B during the period in which the processing switching signal is in a high state, and the ranging processor 101 generates a histogram regarding the near range and detects peaks therein. The ranging process B is performed in two repetitive cycles according to the ranging pattern (c). Note that, the ranging process B in the two cycles may be performed all together to generate a histogram and detect peaks.

The generating section 111 reads setting information of the ranging process C to be performed in a next processing unit, during the period in which the processing switching signal is in a next low state, according to a command from the overall controller 103, and sets unit time $d_3$ and filter coefficients for the generating section 111 and the signal processing section 112. The overall controller 103 performs the ranging process C during the period in which the processing switching signal is in a high state, and the ranging processor 101 generates a histogram regarding the near range and detects peaks therein.

The ranging apparatus 1 performs a combination of the ranging process A in one processing unit, the ranging process B in two processing units, and the ranging process C in one processing unit described above in two repetitive cycles, according to the ranging pattern (c). The ranging processor 101 supplies the result of the ranging according to the ranging pattern (c) to the overall controller 103, for example.

When the ranging processes in step S102 are completed, the processing goes to step S103. In step S103, the overall controller 103, for example, of the ranging apparatus 1 determines whether peaks of the near range and the far range are included in the result of the ranging on the whole range or not, on the basis of the processed result of step S102. If the overall controller 103 determines that peaks of the near range and the far range are included in the result of the ranging on the whole range (step S103, "Yes"), then the processing goes to step S104.

In step S104, the ranging processor 101 of the ranging apparatus 1 processes all the peaks of the whole range on the basis of the processing result of step S102. For example, the signal processing section 112 of the ranging processor 101 determines the distances up to measurands on the basis of all the peaks in the whole range acquired by the ranging process A. In next step S105, the signal processing section 112 of the ranging processor 101 determines the distances up to near-range measurands from peaks of the near range on the basis of the processing result of step S102, and increases the distance accuracy of the near range with respect to the distance information determined for the whole range in step S104.

In other words, since the ranging process A for the whole range uses longer unit time $d_1$ as unit time d for generating a histogram on the basis of detection time $t_m$, compared with the ranging process B for the near range, it is difficult to obtain desired ranging accuracy particularly in a distance range corresponding to the near range. Thus, the distance information for the near range among the pieces of the distance information determined for the whole range in step S104 is enhanced by the processing of step S105.

In next step S106, the ranging apparatus 1 makes a ranging setting to perform ranging on the whole range and the near range in repetitive cycles. In this example, the ranging apparatus 1 switches from the ranging pattern (c) to the ranging pattern (b) for ranging to make a ranging setting for ranging on the whole range and the near range in repetitive cycles.

According to a more specific example, the setting section 113 of the ranging apparatus 1 reads the information representing the ranging pattern (b) from the set value storing section 114, during the period in which the ranging pattern switching signal is in a low state, according to a command from the overall controller 103, and sets lengths, an execution sequence, and the number of repetitive cycles of the ranging processes A and B for the generating section 111.

When the ranging setting has been made to ranging on the whole range and the near range in repetitive cycles in step S106, the processing goes back to step S102 in which ranging is carried out according to the ranging setting made in step S106 in a manner similar to the above sequence.

If the overall controller 103 determines in step S103 that peaks of at least one of the near range and the far range are not included in the result of the ranging on the whole range (step S103, "No"), then the processing goes to step S110. In step S110, the overall controller 103 determines whether peaks of the near range are included in the result of the ranging on the whole range or not, on the basis of the processing result of step S102. If the overall controller 103 determines that peaks of the near range are not included (step S110, "No"), then the processing goes to step S112.

If the overall controller 103 determines in step S110 that peaks of the near range are included (step S110, "Yes"), then the processing goes to step S111. In step S111, the ranging processor 101 determines the distances up to near-range measurands from peaks of the near range on the basis of the processing result of step S102, and increases the distance accuracy of the near range with respect to the distance information determined for the whole range in step S102. When the processing of step S111 is completed, the processing goes to step S112.

In step S112, the overall controller 103 determines whether peaks of the far range are included in the result of the ranging on the whole range or not, on the basis of the processing result of step S102. If the overall controller 103 determines that peaks of the far range are not included (step S112, "No"), then the processing goes back to step S101 in which a ranging setting is made to perform ranging on the whole range, the near range, and the far range.

On the other hand, if the overall controller 103 determines in step S112 that peaks of the far range are included (step S112, "Yes"), then the processing goes to step S113. In step S113, the overall controller 103 determines whether the ranging setting has been made to perform ranging on the whole range, the near range, and the far range or not. In this example, the overall controller 103 determines that the ranging setting has been made to perform ranging on the whole range, the near range, and the far range, in the case where the ranging pattern (c) is selected.

If the overall controller 103 determines in step S113 that the ranging setting has not been made to perform ranging on the whole range, the near range, and the far range (step S113, "No"), the processing goes back to step S101. For example, in a case where the overall controller 103 determines in step S103 that peaks of the near range and the far range are included in the result of the ranging on the whole range, the ranging setting is made to perform ranging on the whole range and the near range in repetitive cycles in step S106, the processing goes through step S102 to step S103 in which the overall controller 103 determines that peaks of the near range and the far range are not included in the result of the ranging on the whole range, and the processing goes to step S113, then the ranging setting has not been made to perform ranging on the whole range, the near range, and the far range. In step S101, as described above, a ranging setting is made to perform ranging on the whole range, the near range, and the far range.

On the other hand, if the overall controller 103 determines in step S113 that the ranging setting has been made to perform ranging on the whole range, the near range, and the far range, then the processing goes to step S114. In step S114, the ranging processor 101 processes the peaks of the far range acquired in step S102. After the processing of step S114, the processing goes back to step S102.

The ranging apparatus 1 according to the second embodiment is thus able to perform ranging processes by switching between plural ranging patterns, on the basis of the result of the ranging on the whole range. It is accordingly possible to perform ranging under appropriate conditions in the near range and the far range. In the near range, for example, distance information can be acquired with higher accuracy and, in the far range, the amount of data to be processed is reduced.

Third Embodiment

Figure 15:
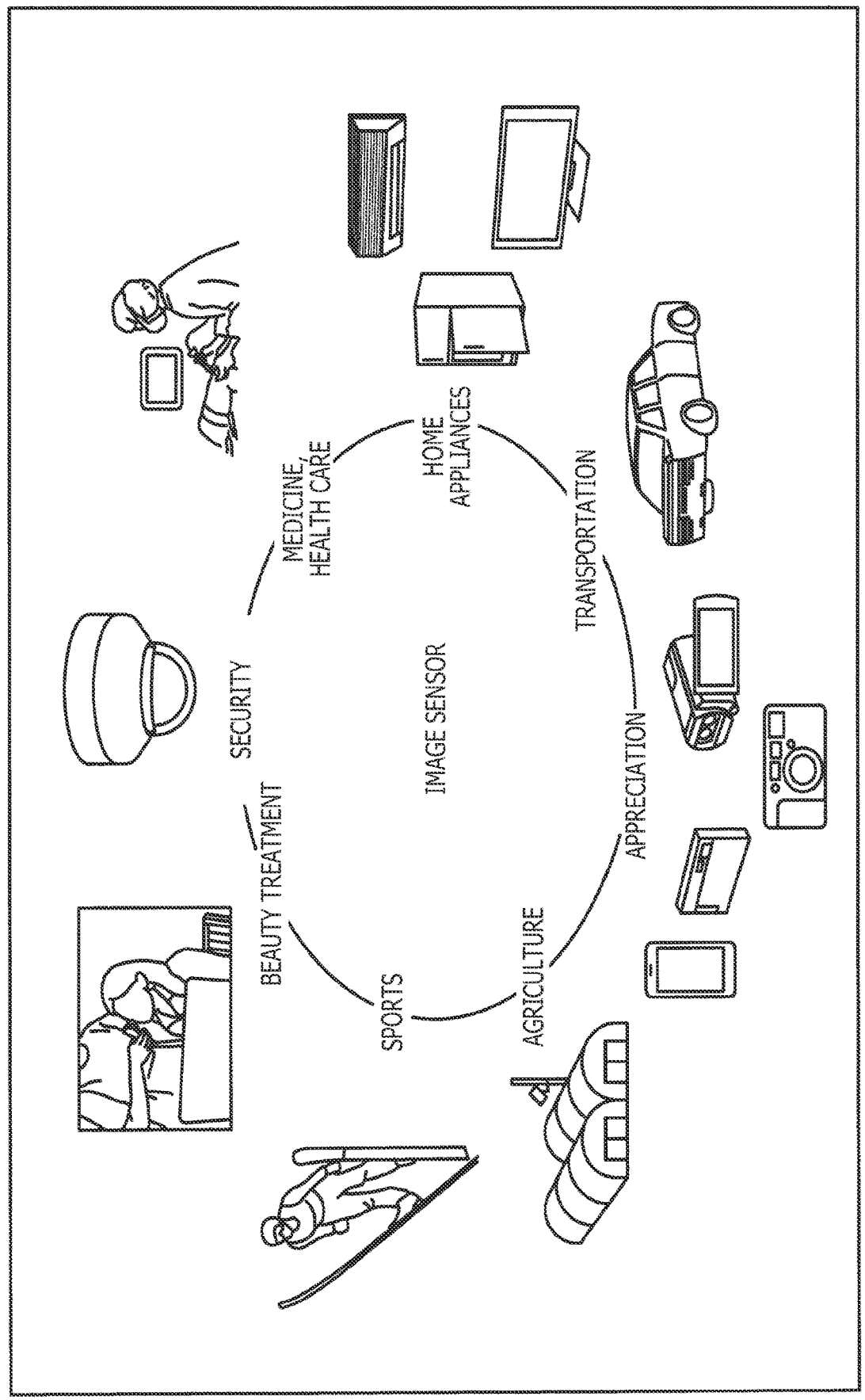
FIG. 15 is a diagram illustrating examples according to a third embodiment, in which the ranging apparatus according to the first embodiment, the modification thereof, and the second embodiment are used.

Next, applications of the ranging apparatus 1 according to the first embodiment of the present disclosure, the modification thereof, and the second embodiment will be described as a third embodiment of the present disclosure below. FIG. 15 is a diagram illustrating examples according to the third embodiment, in which the ranging apparatus 1 according to the first embodiment, the modification thereof, and the second embodiment is used.

The ranging apparatus 1 described above can be used in various cases for sensing visible light, infrared light, ultraviolet light, X-rays, etc., as described below, for example.

Devices for capturing images for use in appreciation, such as digital cameras, portable devices with a camera function, etc.

Devices for use in transportation, such as vehicle-mounted sensors for capturing images in front of, behind, around, inside, etc., automobiles for recognizing states of drivers, etc., monitoring cameras for monitoring traveling vehicles and roads, ranging sensors for measuring the distances between vehicles, etc.

Devices for use in home appliances such as TV sets, refrigerators, air conditioners, etc., for capturing images of gestures of users and controlling the home appliances according to the gestures.

Devices for use in medicine and health care such as endoscopes, devices for capturing images of blood vessels by detecting infrared light, etc.

Devices for use in security, such as monitoring cameras for use in crime prevention, cameras for use in personal authentication, etc.

Devices for use in beauty treatment, such as skin measuring instruments for capturing images of the skin, microscopes for capturing images of the scalp, etc.

Devices for use in sports, such as action cameras and wearable cameras for use in sports, etc.

Devices for use in agriculture, such as cameras for monitoring states of farms and crops, etc.

Further Applications of the Technology According to the Present Disclosure (Applications to Mobile Bodies)

The technology according to the present disclosure may further be applied to devices mounted on various mobile bodies including automobiles, electric automobiles, hybrid electric automobiles, motorcycles, bicycles, personal mobility, airplanes, drones, ships, and robots.

Figure 16:
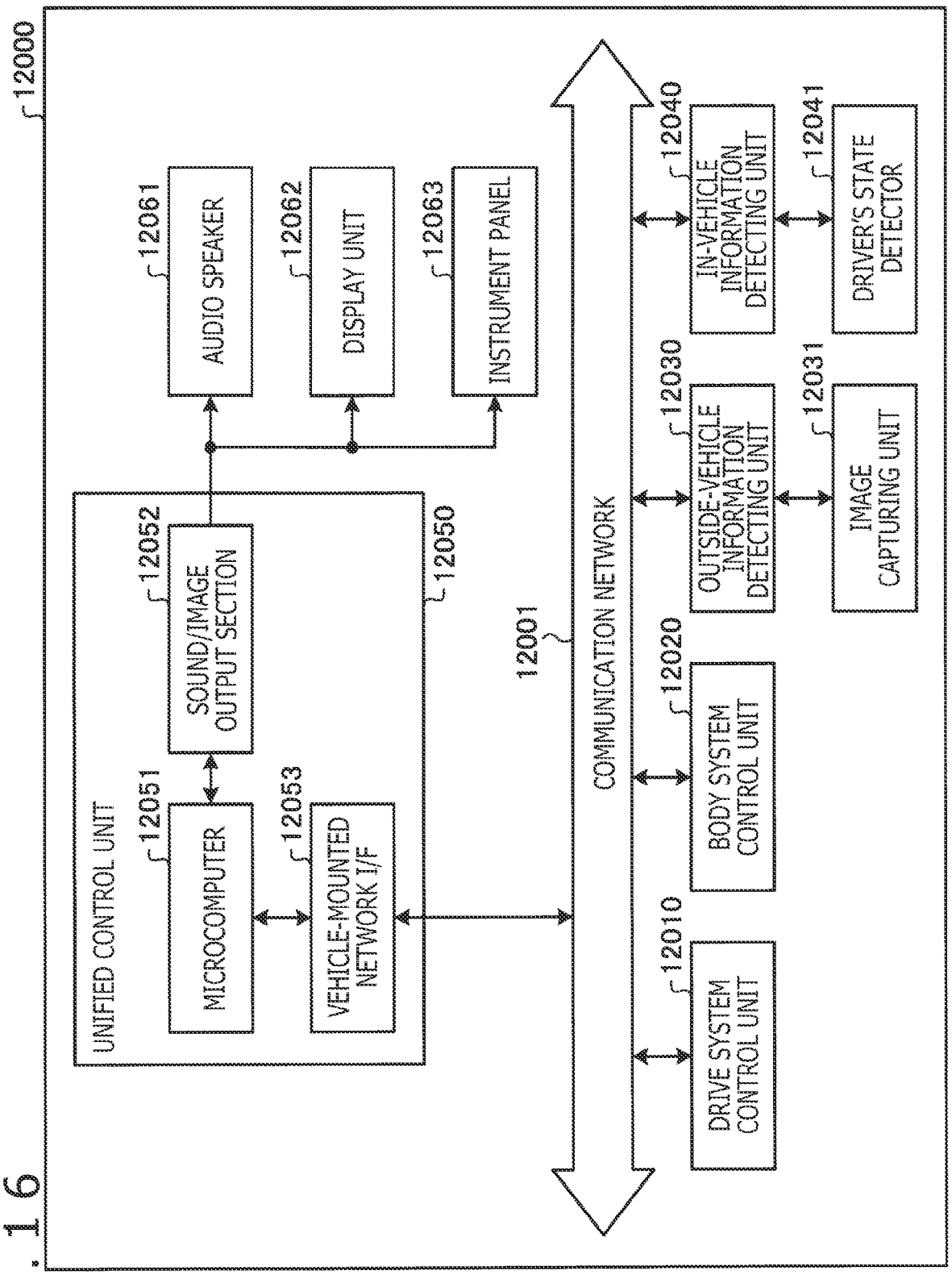
FIG. 16 is a block diagram illustrating a general configurational example of a vehicle control system as an example of a mobile body control system to which the technology according to the present disclosure is applicable.

FIG. 16 is a block diagram illustrating a general configurational example of a vehicle control system as an example of a mobile body control system to which the technology according to the present disclosure is applicable.

The vehicle control system, denoted by 12000, includes plural electronic control units interconnected through a communication network 12001. In the example illustrated in FIG. 16, the vehicle control system 12000 includes a drive system control unit 12010, a body system control unit 12020, an outside-vehicle information detecting unit 12030, an in-vehicle information detecting unit 12040, and a unified control unit 12050. Further, the unified control unit 12050 has functional components illustrated as a microcomputer 12051, a sound/image output section 12052, and a vehicle-mounted network I/F (interface) 12053.

The drive system control unit 12010 controls operation of devices related to the drive system of the vehicle according to various programs. For example, the drive system control unit 12010 functions as a control apparatus for a drive power generating apparatus for generating drive power of the vehicle, such as an internal combustion engine or a drive motor, a drive power transmitting apparatus for transmitting drive power to wheels, a steering mechanism for adjusting the steering angle of the vehicle, a braking apparatus for generating braking forces of the vehicle, etc.

The body system control unit 12020 controls operation of various apparatuses incorporated in the vehicle body, according to various programs. For example, the body system control unit 12020 functions as a control apparatus for a keyless entry system, a smart key system, a power window device, and various lamps such as headlamps, back lamps, brake lamps, winkers, and fog lamps. In this case, the body system control unit 12020 can be supplied with radio waves transmitted from a portable device as a substitute for a key or signals from various switches. The body system control unit 12020 receives these radio waves or signals input thereto and controls door lock devices, the power window device, the lamps, etc., of the vehicle.

The outside-vehicle information detecting unit 12030 detects information outside of the vehicle that incorporates the vehicle control system 12000. For example, an image capturing unit 12031 is connected to the outside-vehicle information detecting unit 12030. The outside-vehicle information detecting unit 12030 enables the image capturing unit 12031 to capture an image of the outside of the vehicle and receives the captured image. The outside-vehicle information detecting unit 12030 may perform an object detecting process or a distance detecting process on people, vehicles, obstacles, characters on the road, etc., on the basis of the received image. The outside-vehicle information detecting unit 12030 performs, for example, an image processing process on the received image and performs an object detecting process or a distance detecting process on the basis of the result of the image processing process.

The image capturing unit 12031 includes an optical sensor for detecting light and outputting an electric signal depending on the amount of detected light. The image capturing unit 12031 may output an electric signal as an image or as ranging information. Further, the light that is detected by the image capturing unit 12031 may be visible light or nonvisible light such as infrared rays.

The in-vehicle information detecting unit 12040 detects information inside of the vehicle. For example, a driver's state detector 12041 for detecting a state of the driver is connected to the in-vehicle information detecting unit 12040. The driver's state detector 12041 includes a camera for capturing an image of the driver, for example. The in-vehicle information detecting unit 12040 may calculate the degree of fatigue or the degree of concentration of the driver or may determine whether the driver is drowsing or not, on the basis of the detected information input from the driver's state detector 12041.

The microcomputer 12051 can calculate a control target value for the drive power generating apparatus, the steering mechanism, or the braking apparatus on the basis of the information inside or outside of the vehicle that is acquired by the outside-vehicle information detecting unit 12030 or the in-vehicle information detecting unit 12040, and can output a control command to the drive system control unit 12010. For example, the microcomputer 12051 can perform coordinated control for realizing functions of an ADAS (Advanced Driver Assistance System) including collision avoidance or shock softening of the vehicle, following travelling based on a vehicle to vehicle distance, traveling at a maintained vehicle speed, collision warning for the vehicle, lane departure warning for the vehicle, etc.

Moreover, the microcomputer 12051 can control the drive power generating apparatus, the steering mechanism, the braking apparatus, etc., on the basis of the information around the vehicle that is acquired by the outside-vehicle information detecting unit 12030 or the in-vehicle information detecting unit 12040, to thereby perform coordinated control for the purpose of automatic driving in which the vehicle travels autonomously without driver's operation.

Further, the microcomputer 12051 can output a control command to the body system control unit 12020 on the basis of the information outside of the vehicle that is acquired by the outside-vehicle information detecting unit 12030. For example, the microcomputer 12051 can control the headlamps depending on the position of a preceding vehicle or an oncoming vehicle that is detected by the outside-vehicle information detecting unit 12030, to thereby perform coordinated control for the purpose of antiglare operation to switch from high beams to low beams, etc.

The sound/image output section 12052 transmits at least one of sound and image output signals to an output device capable of sending visual or audio information to passengers of the vehicle or the outside of the vehicle. In the example illustrated in FIG. 16, an audio speaker 12061, a display unit 12062, and an instrument panel 12063*l* are illustrated by way of example as the output device. The display unit 12062 may include at least one of an on-board display or a head-up display, for example.

Figure 17:
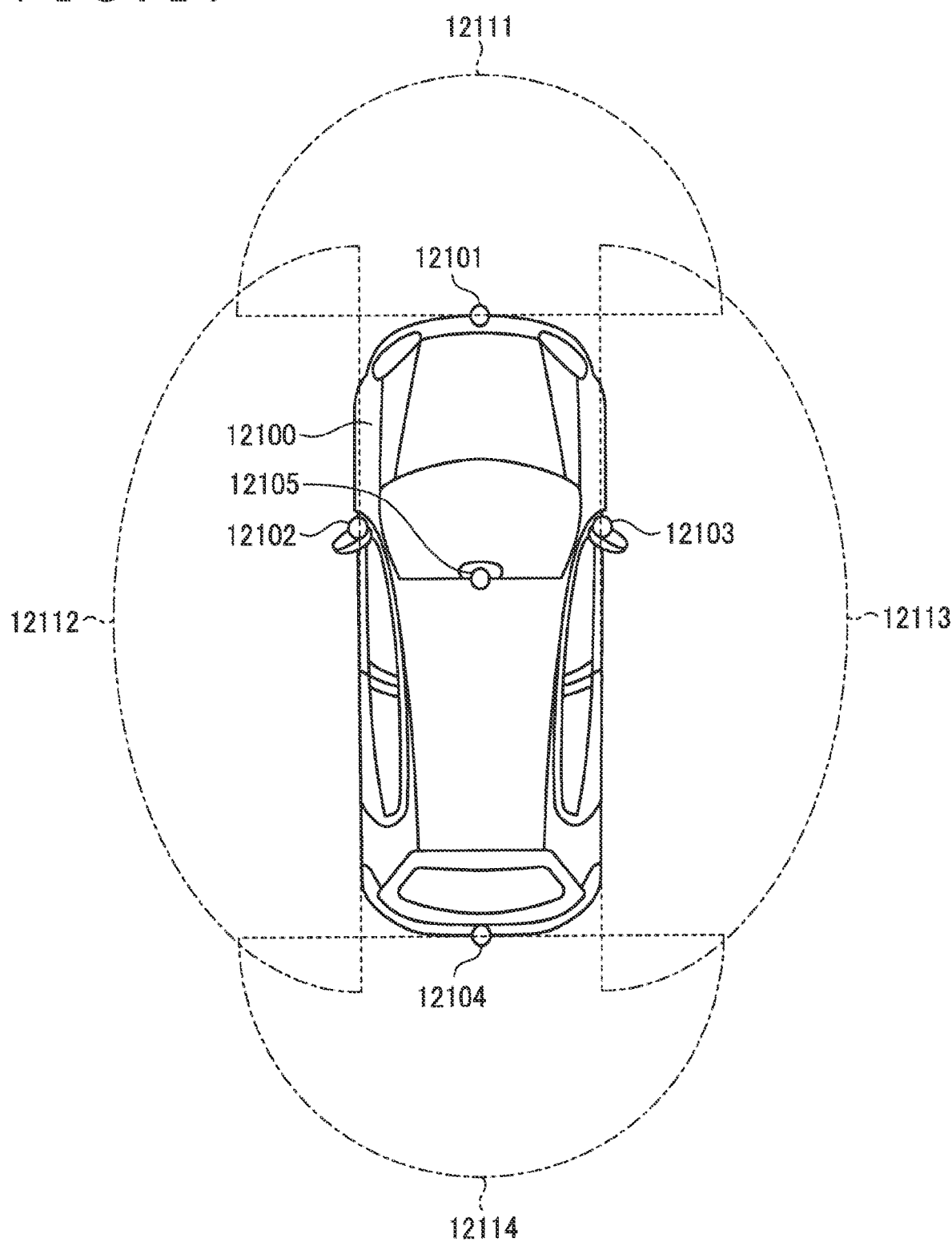
FIG. 17 is a view illustrating an example of positions where image capturing units are installed.

FIG. 17 is a view illustrating an example of positions where image capturing units 12031 are installed. In FIG. 17, the vehicle, denoted by 12100, has image capturing units 12101, 12102, 12103, 12104, and 12105 as the image capturing units 12031.

The image capturing units 12101, 12102, 12103, 12104, and 12105 are disposed in positions on a front nose, side mirrors, a rear bumper, a back door, and an upper portion of a front windshield within the cabin of the vehicle 12100, for example. The image capturing unit 12101 on the front nose and the image capturing unit 12015 on the upper portion of the front windshield within the cabin of the vehicle mainly captures images in front of the vehicle 12100. The image capturing units 12102 and 12103 on the side mirrors mainly capture images sideways of the vehicle 12100. The image capturing unit 12104 disposed on the rear bumper or the back door mainly captures an image behind the vehicle 12100. The front images acquired by the image capturing units 12101 and 12105 are mainly used to detect a preceding vehicle, pedestrians, obstacles, traffic signals, traffic signs, lanes, or the like.

Incidentally, FIG. 17 illustrates an example of image capturing ranges of the image capturing units 12101 through 12104. The image capturing range, denoted by 12111, represents the image capturing range of the image capturing unit 12101 on the front nose, and the image capturing ranges, denoted by 12112 and 12113, represent the image capturing ranges of the image capturing units 12102 and 12103 on the respective side mirrors. The image capturing range, denoted by 12114, represents the image capturing range of the image capturing unit 12104 on the rear bumper or the back door. A bird's-eye view image representing the vehicle 12100 as viewed from above is obtained by combining pieces of image data captured by the image capturing units 12101 through 12104, for example.

At least one of the image capturing units 12101 through 12104 may have a function of acquiring distance information. For example, at least one of the image capturing units 12101 through 12104 may be a stereo camera including plural image capturing devices or an image capturing device having pixels for detecting a phase difference.

For example, the microcomputer 12051 determines the distances up to respective solid objects in the image capturing ranges 12111 through 12114 and time-depending changes in the distances (relative speeds with respect to the vehicle 12100) on the basis of the distance information obtained from the image capturing units 12101 through 12104, so that the microcomputer 12051 can particularly extract a solid object that is positioned on the path ahead of the vehicle 12100 most closely to the vehicle 12100 and is traveling in substantially the same direction as the vehicle 12100 and at a predetermined speed (e.g., 0 km/h or higher), as a preceding vehicle. Further, the microcomputer 12051 can preset a vehicle to vehicle distance to be secured up to the preceding vehicle and perform an automatic brake control process (including a following stopping control process) or an automatic acceleration control process (including a following starting control process). In such a manner, the microcomputer 12051 can perform coordinated control for the purpose of automatic driving to control the vehicle to travel autonomously without driver's operation.

For example, the microcomputer 12051 classifies solid object data regarding solid objects into two-wheeled vehicles, ordinary vehicles, large-size vehicles, pedestrians, utility posts, and other solid objects on the basis of the distance information obtained from the image capturing units 12101 through 12104, extracts those objects, and uses the extracted objects for automatically avoiding obstacles. For example, the microcomputer 12051 identifies obstacles around the vehicle 12100 as obstacles that can be visually recognized by the driver of the vehicle 12100 and obstacles that are hard to be visually recognized by the driver of the vehicle 12100. Then, the microcomputer 12051 assesses a collision risk indicative of the danger of a collision with each of the obstacles. If the collision risk is equal to or higher than a preset value, indicating that there is a possibility of collision, then the microcomputer 12051 outputs a warning to the driver through the audio speaker 12061 or the display unit 12062 or controls the drive system control unit 12010 to forcibly decelerate the vehicle or steer the vehicle to avoid a collision, thereby assisting the driver in driving the vehicle for collision avoidance.

At least one of the image capturing units 12101 through 12104 may be an infrared camera for detecting infrared rays. For example, the microcomputer 12051 can recognize a pedestrian by determining whether the pedestrian is present in the images captured by the image capturing units 12101 through 12104 or not. The recognition of a pedestrian is carried out by a procedure for extracting feature points in the images captured by the image capturing units 12101 through 12104 as infrared cameras and a procedure for performing a pattern matching process on a series of feature points representing the profile of an object to determine whether the object is a pedestrian or not. If the microcomputer 12051 determines that a pedestrian is present in the images captured by the image capturing units 12101 through 12104 and recognizes the pedestrian, then the sound/image output section 12052 controls the display unit 12062 to display an emphatic square profile line in overlapping relation to the recognized pedestrian. Furthermore, the sound/image output section 12052 may control the display unit 12062 to display an icon or the like representing the pedestrian in a desired position.

The example of the vehicle control system to which the technology according to the present disclosure is applicable has been described above. The technology according to the present disclosure is applicable to the image capturing unit 12031, for example, among the components described above. Specifically, the ranging apparatus 1 according to the first embodiment of the present disclosure, its modification, and the second embodiment of the present disclosure described above can be applied to the image capturing unit 12031. The technology according to the present disclosure as applied to the image capturing unit 12031 makes it possible to perform ranging from the vehicle as it travels, with high accuracy.

Note that the advantages set forth in the present description are given by way of illustrative example only and are not restrictive, and additional advantages may be present.

Note that the present technology may also take the following arrangements.

(1)

A ranging apparatus including:
- a photodetector including a light detecting device;
- a time measuring section for measuring a period of time from an emission timing at which a light source emits light to a detection timing at which the light detecting device detects the light, thereby acquiring measured values;
- a generating section for generating a histogram of the measured values; and
- a calculating section for calculating a distance up to a measurand on the basis of the histogram, in which
- the generating section generates the histogram on the basis of plural measuring conditions regarding the period of time.

(2)

The ranging apparatus according to (1), in which
- the generating section generates the histogram of the measured values in each of periods that are designated respectively as the plural measuring conditions and during which the time measuring section has measured and acquired the measured values.

(3)

The ranging apparatus according to (2), in which
the generating section generates the histogram by counting the measured values on the basis of unit times having lengths depending on periods of times from the emission timing to the periods.

(4)

The ranging apparatus according to any one of (1) through (3), in which
the generating section generates the histogram of the measured values that are measured and acquired according to measuring conditions designated from the plural measuring conditions on the basis of the measured values that are measured and acquired throughout an entire exposure period in the photodetector.

(5)

The ranging apparatus according to any one of (1) through (4), in which
the generating section generates the histogram per each of the plural measuring conditions by using the plural measuring conditions in a predetermined sequence.

(6)

The ranging apparatus according to any one of (1) through (5), in which
the generating section generates the histogram per each of the plural measuring conditions that are included in a pattern selected from plural patterns including a combination of the plural measuring conditions that are different from each other.

(7)

The ranging apparatus according to (6), in which
the generating section further generates the histogram per each of the plural measuring conditions that are included in a pattern selected from plural patterns on the basis of the histogram.

(8)

The ranging apparatus according to (2), in which
the generating section generates the histogram per each of the periods into which an exposure period in the photodetector is divided.

(9)

The ranging apparatus according to (8), in which the generating section:
generates the histogram in the periods including overlapping portions with respect to the divided periods.

(10)

The ranging apparatus according to any one of (1) through (9), further including:
a storing section for storing information for setting the plural measuring conditions, in which
at least the generating section, the calculating section, and the storing section among the photodetector, the time measuring section, the generating section, the calculating section, and the storing section are fabricated on one semiconductor chip.

(11)

A measuring apparatus including:
a photodetector including a light detecting device;
a time measuring section for measuring a period of time from an emission timing at which a light source emits light to a detection timing at which the light detecting device detects the light, thereby acquiring measured values; and
a generating section for generating a histogram of the measured values, in which the generating section generates the histogram on the basis of plural measuring conditions regarding the period of time.

(12)

The measuring apparatus according to (11), in which
the generating section generates the histogram of the measured values in each of periods that are designated respectively as the plural measuring conditions and during which the time measuring section has measured and acquired the measured values.

(13)

The measuring apparatus according to (12), in which
the generating section generates the histogram by counting the measured values on the basis of unit times having lengths depending on periods of times from the emission timing to the periods.

(14)

The measuring apparatus according to any one of (11) through (13), in which
the generating section generates the histogram of the measured values that are measured and acquired according to measuring conditions designated from the plural measuring conditions on the basis of the measured values that are measured and acquired throughout an entire exposure period in the photodetector.

(15)

The measuring apparatus according to any one of (11) through (14), in which
the generating section generates the histogram per each of the plural measuring conditions by using the plural measuring conditions in a predetermined sequence.

(16)

The measuring apparatus according to any one of (11) through (15), in which the generating section:
generates the histogram per each of the plural measuring conditions that are included in a pattern selected from plural patterns including a combination of the plural measuring conditions that are different from each other.

(17)

The measuring apparatus according to (16), in which
the generating section further generates the histogram per each of the plural measuring conditions that are included in a pattern selected from the plural patterns on the basis of the histogram.

(18)

The measuring apparatus according to (12), in which
the generating section generates the histogram per each of the periods into which an exposure period in the photodetector is divided.

(19)

The measuring apparatus according to (18), in which
the generating section generates the histogram in the periods including overlapping portions with respect to the divided periods.

(20)

The measuring apparatus according to any one of (11) through (19), further including:
a storing section for storing information for setting the plural measuring conditions, in which
at least the generating section and the storing section among the photodetector, the time measuring section, the generating section, and the storing section are fabricated on one semiconductor chip.

REFERENCE SIGNS LIST

1, 300: Ranging apparatus
2, 301: Light source unit

3: Storage unit
4: Controller
10: Pixel
20: Light detecting chip
21: Logic chip
100: Pixel array
101: Ranging processor
102: Pixel controller
103: Overall controller
104: Clock generator
105: Light emission timing controller
106: Interface
111: Generating section
112: Signal processing section
113: Setting section
114: Set value storing section
200: Logic array
201: Signal processing circuit
203: Device controller
320, 320a, 320b, 320c, 320m: Histogram
1000: Light detecting device

The invention claimed is:

1. A ranging apparatus, comprising:
a photodetector including a light detecting device;
a time measuring section configured to measure a period of time from an emission timing to a detection timing, wherein
the period of time is measured to acquire measured values,
the emission timing is a timing at which a light source emits light to the detection timing, and
the detection timing is a timing at which the light detecting device detects the light;
a generating section configured to generate a histogram of the measured values, wherein
the histogram is generated based on a plurality of measuring conditions regarding the period of time,
the generation is in each of periods that are designated respectively as the measuring conditions and during which the time measuring section has measured and acquired the measured values, and
the histogram is generated for each of periods into which an exposure period in the photodetector is divided, and in periods including overlapped portions with respect to the divided exposure period; and
a calculating section configured to calculate a distance up to a measurand based on the histogram.

2. The ranging apparatus according to claim 1, wherein the generating section is further configured to generate the histogram based on a count of the measured values, wherein the count is based on a unit times having lengths that depends on periods of times from the emission timing to the periods that are designated respectively as the measuring conditions.

3. The ranging apparatus according to claim 1, wherein the generating section is further configured to generate the histogram of the measured values that are measured and acquired based on measuring conditions designated from the plurality of measuring conditions based on the measured values that are measured and acquired throughout the exposure period in the photodetector.

4. The ranging apparatus according to claim 1, wherein the generating section is further configured to generate the histogram for each of the plurality of measuring conditions by using the plurality of measuring conditions in a specific sequence.

5. The ranging apparatus according to claim 1, wherein the generating section is further configured to generate the histogram for each of the plurality of measuring conditions, wherein the plurality of measuring conditions are included in a pattern selected from a plurality of patterns including a combination of the plurality of measuring conditions that are different from each other.

6. The ranging apparatus according to claim 5, wherein the generating section is further configured to generate the histogram for each of the plurality of measuring conditions, wherein the plurality of measuring conditions are included in a pattern selected from a plurality of patterns based on the histogram.

7. The ranging apparatus according to claim 1, further comprising:
a storing section configured to store information to set the plurality of measuring conditions, wherein at least the generating section, the calculating section, and the storing section among the photodetector, the time measuring section, the generating section, the calculating section, and the storing section are fabricated on one semiconductor chip.

8. A measuring apparatus, comprising:
a photodetector including a light detecting device;
a time measuring section configured to measure a period of time from an emission timing to a detection timing, wherein
the period of time is measured to acquire measured values,
the emission timing is a timing at which a light source emits light to the detection timing, and
the detection timing is a timing at which the light detecting device detects the light; and
a generating section configured to generate a histogram of the measured values, wherein
the histogram is generated based on a plurality of measuring conditions regarding the period of time,
the generation is in each of periods that are designated respectively as the measuring conditions and during which the time measuring section has measured and acquired the measured values, and
the histogram is generated for each of periods into which an exposure period in the photodetector is divided, and in periods including overlapped portions with respect to the divided exposure period.

9. The measuring apparatus according to claim 8, wherein the generating section is further configured to generate the histogram based on a count of the measured values, wherein the count is based on unit times having lengths that depends periods of times from the emission timing to the periods that are designated respectively as the measuring conditions.

10. The measuring apparatus according to claim 8, wherein the generating section is further configured to generate the histogram of the measured values that are measured and acquired based on measuring conditions designated from the plurality of measuring conditions on based on the measured values that are measured and acquired throughout the exposure period in the photodetector.

11. The measuring apparatus according to claim 8, wherein the generating section is further configured to generate the histogram for each of the plurality of measuring conditions, wherein the plurality of measuring conditions by using the plurality of measuring conditions in a specific sequence.

12. The measuring apparatus according to claim 8, wherein
    the generating section is further configured to generate the histogram for each of the plurality of measuring conditions, wherein the plurality of measuring conditions are included in a pattern selected from a plurality of patterns including a combination of the plurality of measuring conditions that are different from each other.

13. The measuring apparatus according to claim 12, wherein
    the generating section is further configured to generate the histogram for each of the plurality of measuring conditions, wherein the plurality of measuring conditions are included in a pattern selected from the plurality of patterns based on the histogram.

14. The measuring apparatus according to claim 8, further comprising:
    a storing section configured to store information to set the plurality of measuring conditions, wherein at least the generating section and the storing section among the photodetector, the time measuring section, the generating section, and the storing section are fabricated on one semiconductor chip.

\* \* \* \* \*